US011750890B2

(12) United States Patent
Sugawara et al.

(10) Patent No.: US 11,750,890 B2
(45) Date of Patent: Sep. 5, 2023

(54) CONTENT DELIVERY SYSTEM, CONTENT DELIVERY APPARATUS, AND METHOD

(71) Applicants: KABUSHIKI KAISHA TOSHIBA, Tokyo (JP); Toshiba Infrastructure Systems & Solutions Corporation, Kawasaki (JP)

(72) Inventors: Yukihiro Sugawara, Kokubunji (JP); Keita Iwami, Fuchu (JP)

(73) Assignees: KABUSHIKI KAISHA TOSHIBA, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 17/342,863

(22) Filed: Jun. 9, 2021

(65) Prior Publication Data

US 2021/0297750 A1  Sep. 23, 2021

Related U.S. Application Data

(63) Continuation of application No. PCT/JP2019/048356, filed on Dec. 10, 2019.

(30) Foreign Application Priority Data

Dec. 10, 2018 (JP) ................. 2018-230690
Dec. 9, 2019 (JP) ................. 2019-222165

(51) Int. Cl.
*H04N 21/6405* (2011.01)
*H04N 21/643* (2011.01)
*H04N 21/647* (2011.01)

(52) U.S. Cl.
CPC ....... *H04N 21/6405* (2013.01); *H04N 21/647* (2013.01); *H04N 21/64322* (2013.01)

(58) Field of Classification Search
CPC ......... H04N 21/6405; H04N 21/64322; H04N 21/647; H04N 21/24; H04N 21/262; G06F 13/00
See application file for complete search history.

(56) References Cited

U.S. PATENT DOCUMENTS

2002/0034255 A1* 3/2002 Zetts .................. H04N 21/8547
375/E7.278
2004/0240466 A1* 12/2004 Unitt .................. H04N 21/266
370/461

(Continued)

FOREIGN PATENT DOCUMENTS

JP  2004-048430 A  2/2004
JP  2005-333568 A  12/2005

(Continued)

OTHER PUBLICATIONS

T. Edwards, "RTP Payload for Society of Motion Picture and Television Engineers (SMPTE) ST 291-1 Ancillary Data", Internet Engineering Task Force (IETF); Request for Comments: 8331; Category: Standards Track; ISSN: 2070-1721; FOX Feb. 2018, pp. 1-20.

(Continued)

*Primary Examiner* — Fernando Alcon
(74) *Attorney, Agent, or Firm* — Oblon, McClelland, Maier & Neustadt, L.L.P.

(57) ABSTRACT

According to the present embodiment, there is provided a content delivery apparatus applied to a content delivery system which delivers content, which is sent from a transmission apparatus, to a reception apparatus by a multicast method via an IP network. The content delivery apparatus includes an analyzer configured to detect a start point or an end point of the content by analyzing control information of the content, and a manager configured to control a reception (Continued)

start or a reception end of the content, based on the start point or the end point.

7 Claims, 18 Drawing Sheets

(56) References Cited

U.S. PATENT DOCUMENTS

| | | | |
|---|---|---|---|
| 2010/0208890 A1 | 8/2010 | Igarashi | |
| 2014/0184909 A1 | 7/2014 | Laabs et al. | |
| 2015/0074732 A1* | 3/2015 | Green | H04N 21/812 |
| | | | 725/93 |
| 2016/0301963 A1 | 10/2016 | Daily et al. | |
| 2016/0373495 A1* | 12/2016 | Chen | H04N 21/44004 |
| 2019/0007716 A1* | 1/2019 | Shi | H04N 21/44227 |
| 2019/0124397 A1 | 4/2019 | Takahashi et al. | |
| 2020/0107062 A1* | 4/2020 | Pichaimurthy | H04L 12/185 |
| 2021/0297729 A1* | 9/2021 | Fersch | H04N 21/440218 |

FOREIGN PATENT DOCUMENTS

| | | |
|---|---|---|
| JP | 2009-165058 A | 7/2009 |
| JP | 2010-192944 A | 9/2010 |
| JP | WO2018/003540 A1 | 1/2018 |
| WO | WO-2015102394 A1 * | 7/2015 ........... H04L 1/0041 |

OTHER PUBLICATIONS

International Search Report dated Mar. 3, 2020 in PCT/JP2019/048356 filed on Dec. 10, 2019, 2 pages.

"AMWA IS-04 NMOS Discovery and Registration Specification (Stable)", AMWA, 2021, 2 pages.

"AMWA IS-05 NMOS Device Connection Management Specification (Stable)", AMWA, 2021, 2 pages.

"AMWA IS-06 NMOS Network Control Specification", AMWA, 2021, 2 pages.

"Structure of Inter-Stationary Conrol Data Conveyed by Ancillary Data Pockets", ARIB STD-B39, Version 1.1-E-1, Association of Radio Industries and Businesses, 2003, 27 pages.

SMPTE ST2022-6 (document not available, listed for informational purposes only).

SMPTE ST2110-40 (document not available, listed for informational purposes only).

SMPTE ST2110-20 (document not available, listed for informational purposes only).

SMPTE ST2110-30 (document not available, listed for informational purposes only).

Extended European Search Report dated Oct. 6, 2022, in corresponding European Patent Application No. 19896404.1, 8 pages.

* cited by examiner

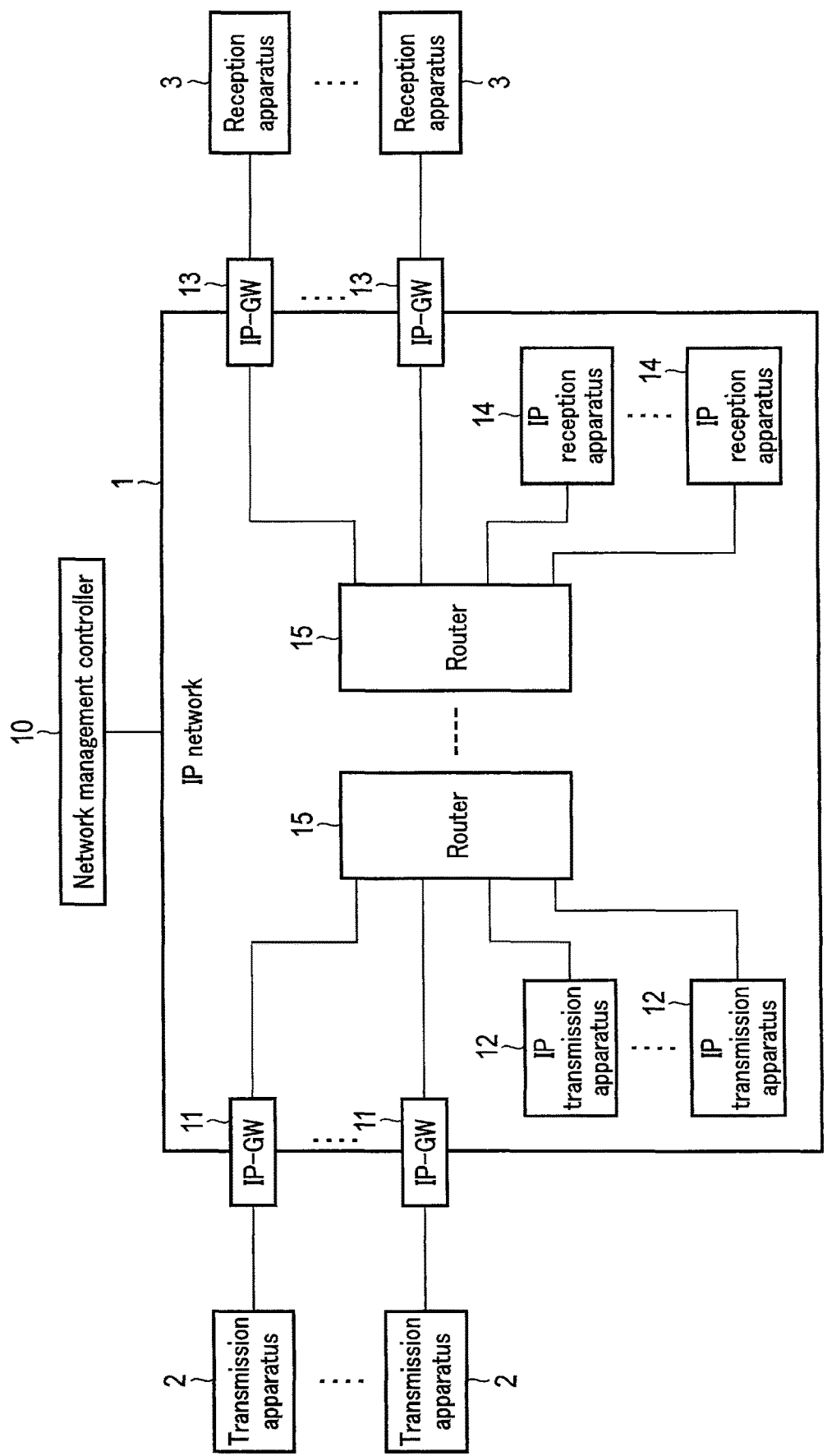
F I G. 1

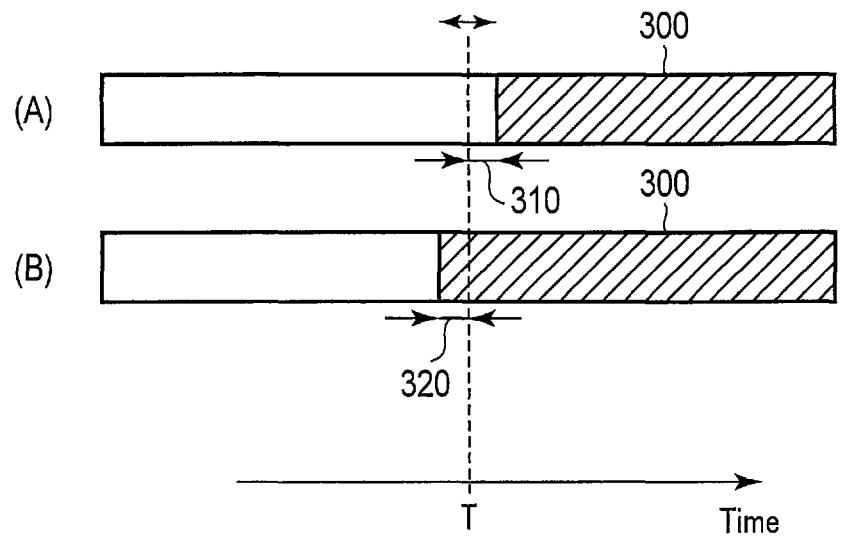
F I G. 11
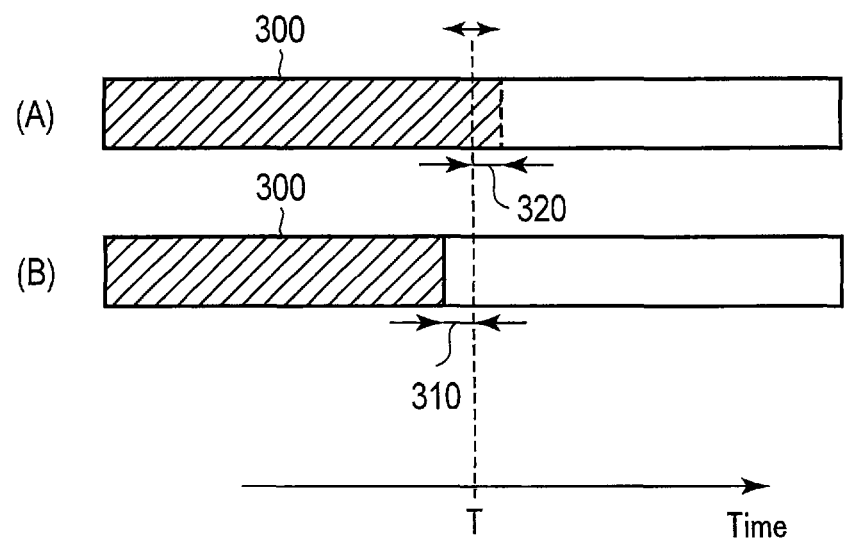
F I G. 12

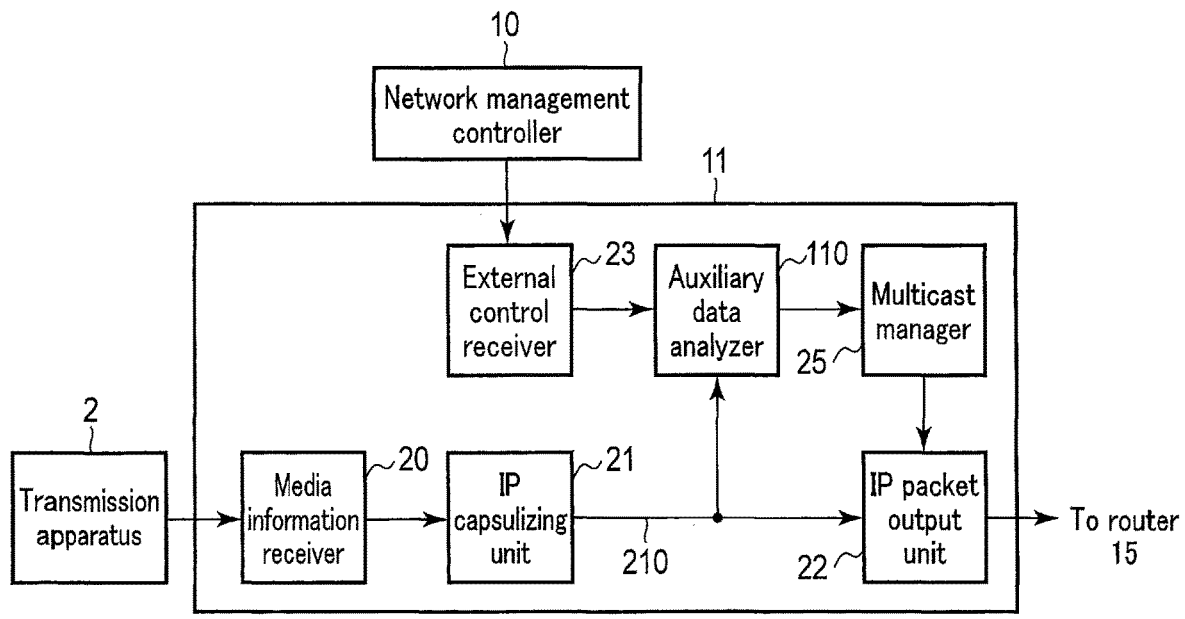
F I G. 13A
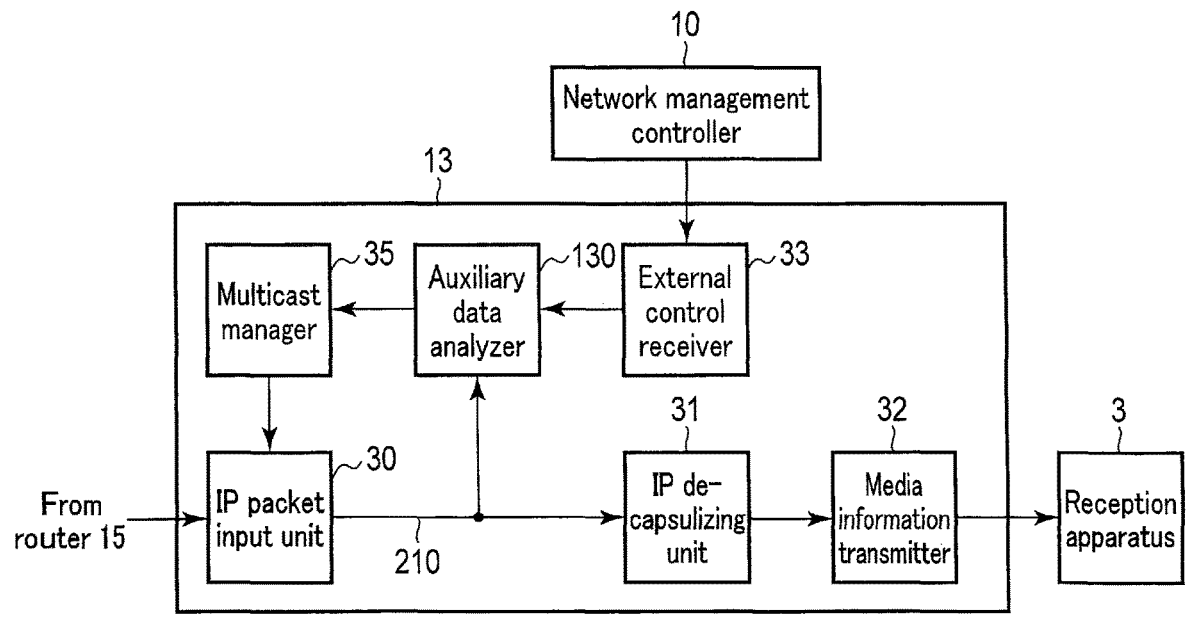
F I G. 13B

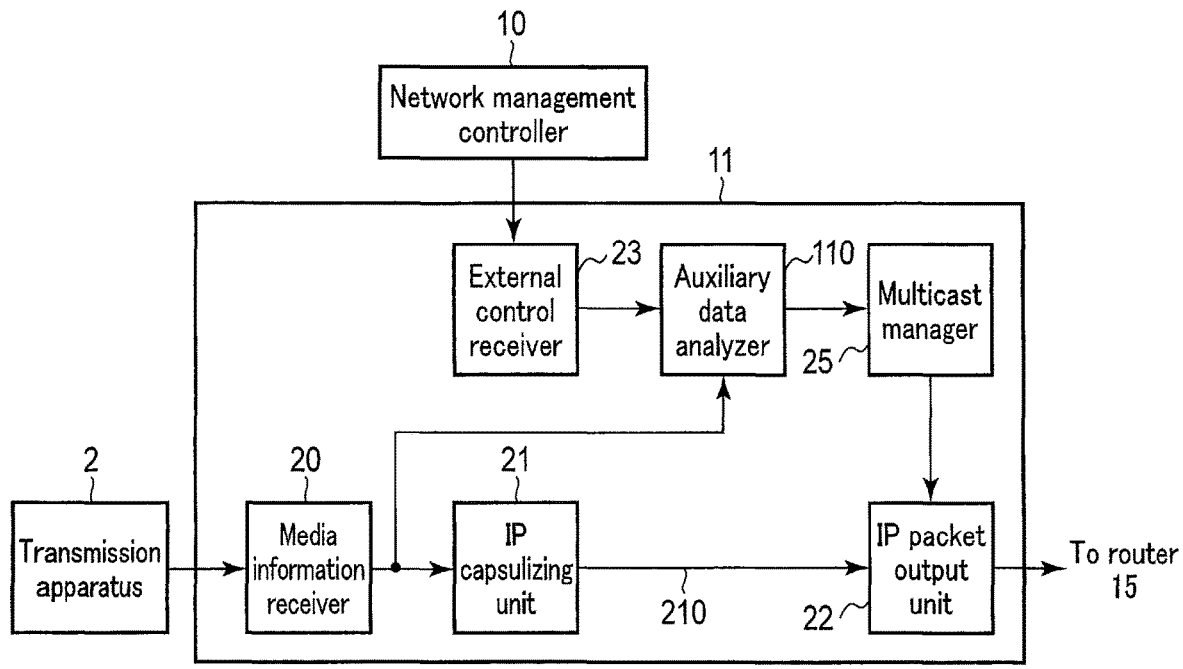
F I G. 14A
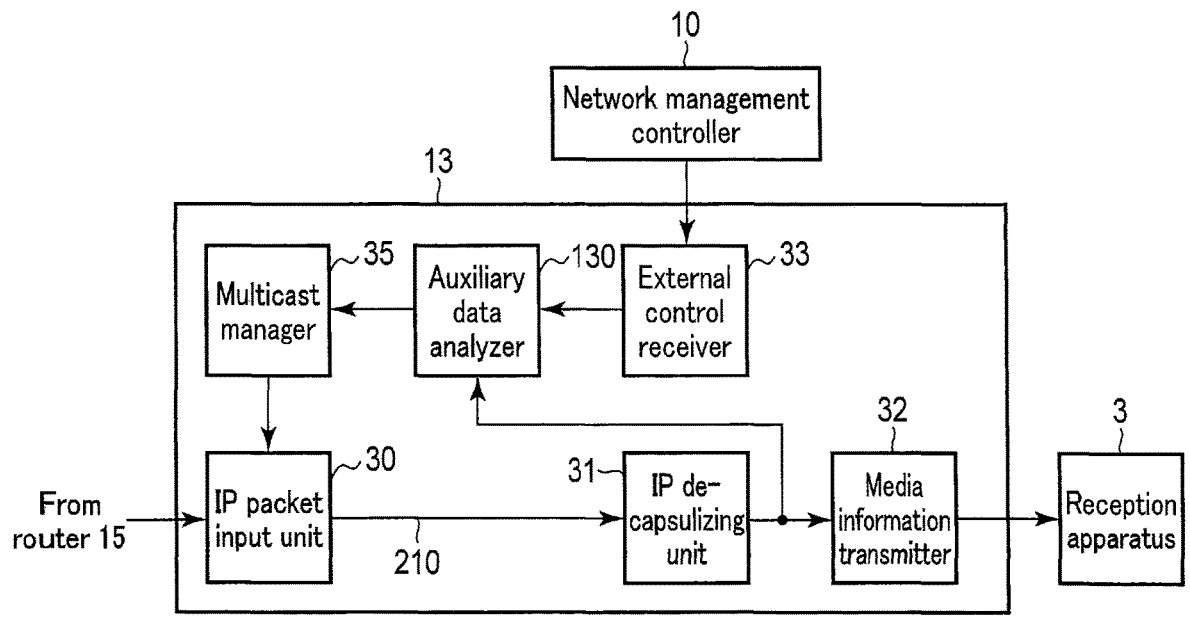
F I G. 14B

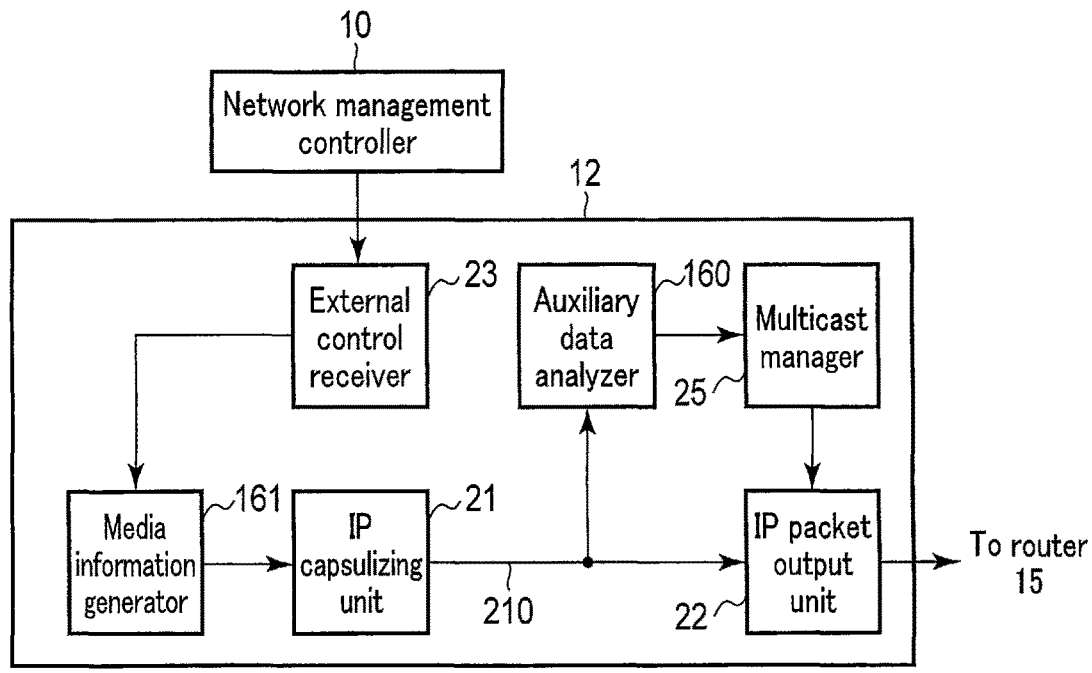
F I G. 15A
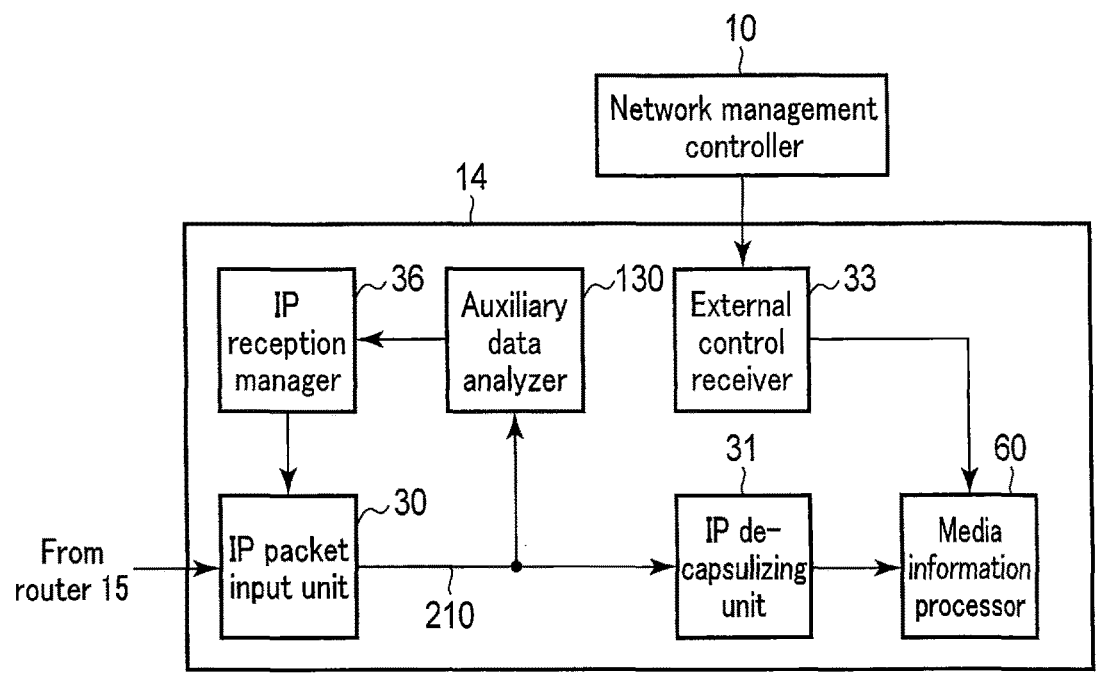
F I G. 15B

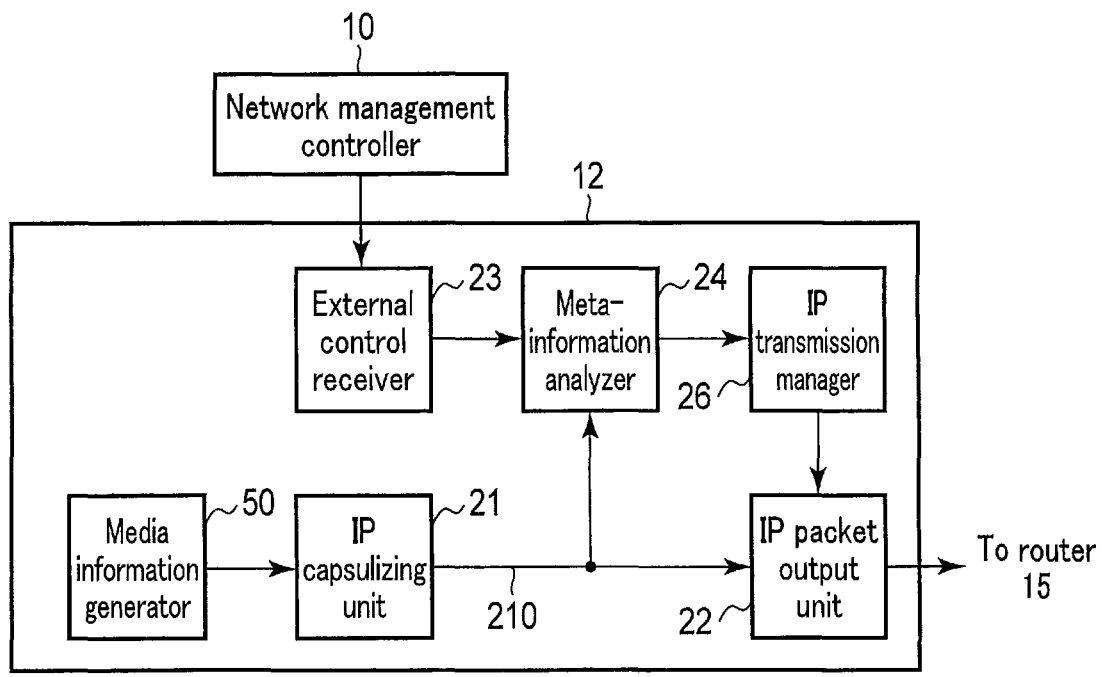
F I G. 19
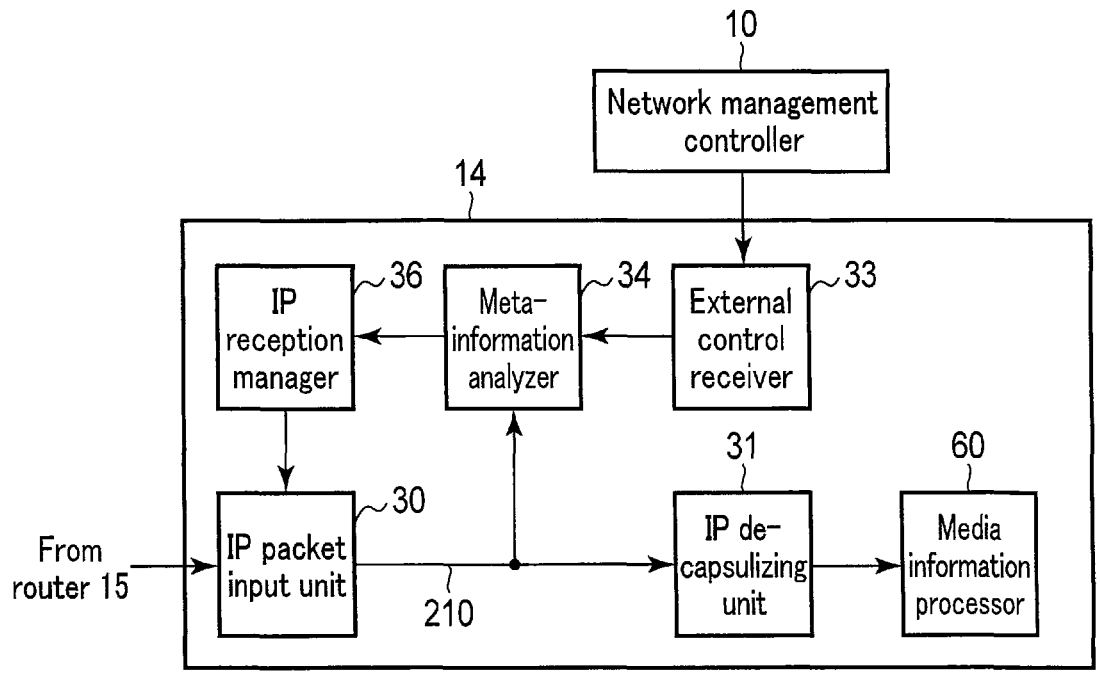
F I G. 20

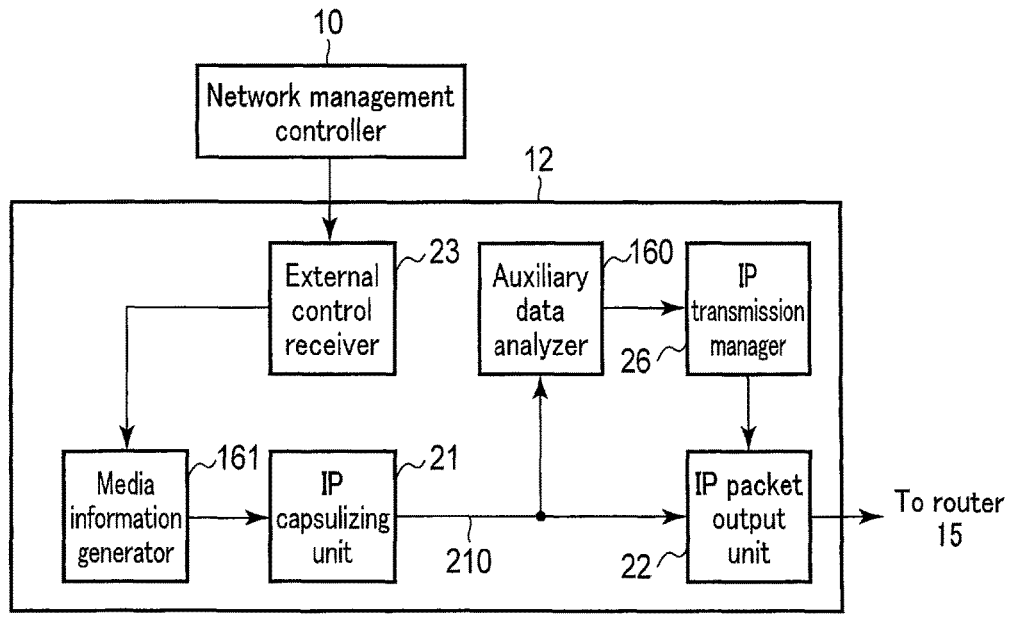
F I G. 25
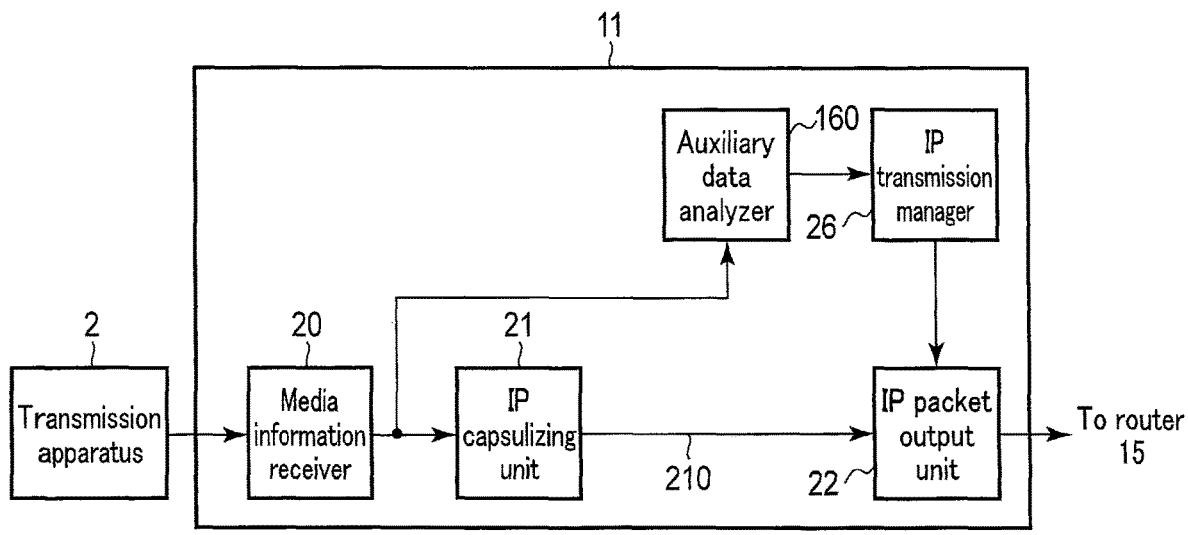
F I G. 26

CONTENT DELIVERY SYSTEM, CONTENT DELIVERY APPARATUS, AND METHOD

CROSS-REFERENCE TO RELATED APPLICATIONS

This application is a Continuation Application of PCT Application No. PCT/JP2019/048356, filed Dec. 10, 2019 and based upon and claiming the benefit of priority from Japanese Patent Applications No. 2018-230690, filed Dec. 10, 2018 and No. 2019-222165, filed Dec. 9, 2019, the entire contents of all of which are incorporated herein by reference.

FIELD

Embodiments described herein relate generally to a content delivery system, a content delivery apparatus, and a method.

BACKGROUND

In recent years, a content delivery system has been realized which delivers digital content (hereinafter referred to simply as "content"), such as video and audio, by using an IP (Internet Protocol) network. The content delivery system is a broadcast or communication system, which delivers a content body (hereinafter referred to as "media information" in some cases) including video, audio and the like, to a plurality of reception sides by a multicast method. In the multicast method, for example, a protocol called IGMP (Internet Group Management Protocol) or MLD (Multicast Listener Discovery) is stipulated. In order to control the multicast transmission by IGMP or MLD, a network management controller manages, in an integrated manner, network devices, such as IP gateways and routers, which are connected to the IP network.

BRIEF DESCRIPTION OF THE DRAWINGS

FIG. 1 is a block diagram illustrating a configuration example of a system according to a first embodiment.

FIG. 11 is a view for describing advantageous effects of the first embodiment.

FIG. 12 is a view for describing advantageous effects of the first embodiment.

FIG. 13A is a block diagram illustrating a configuration example of an IP gateway on the transmission side according to a second embodiment.

FIG. 13B is a block diagram illustrating a configuration example of an IP gateway on the reception side according to the second embodiment.

FIG. 14A is a block diagram illustrating a configuration example of an IP gateway on the transmission side according to the second embodiment.

FIG. 14B is a block diagram illustrating a configuration example of an IP gateway on the reception side according to the second embodiment.

FIG. 15A is a block diagram illustrating a configuration example of an IP transmission apparatus according to Modification 1 of the second embodiment.

FIG. 15B is a block diagram illustrating a configuration example of an IP reception apparatus according to Modification 1 of the second embodiment.

FIG. 19 is a block diagram illustrating a configuration example of an IP transmission apparatus according to the third embodiment.

FIG. 20 is a block diagram illustrating a configuration example of an IP reception apparatus according to the third embodiment.

FIG. 25 is a view illustrating a configuration example of an IP transmission apparatus according to Modification 1 of the fourth embodiment.

FIG. 26 is a view illustrating a configuration example of an IP gateway according to Modification 2 of the fourth embodiment.

DETAILED DESCRIPTION

Figure 2:
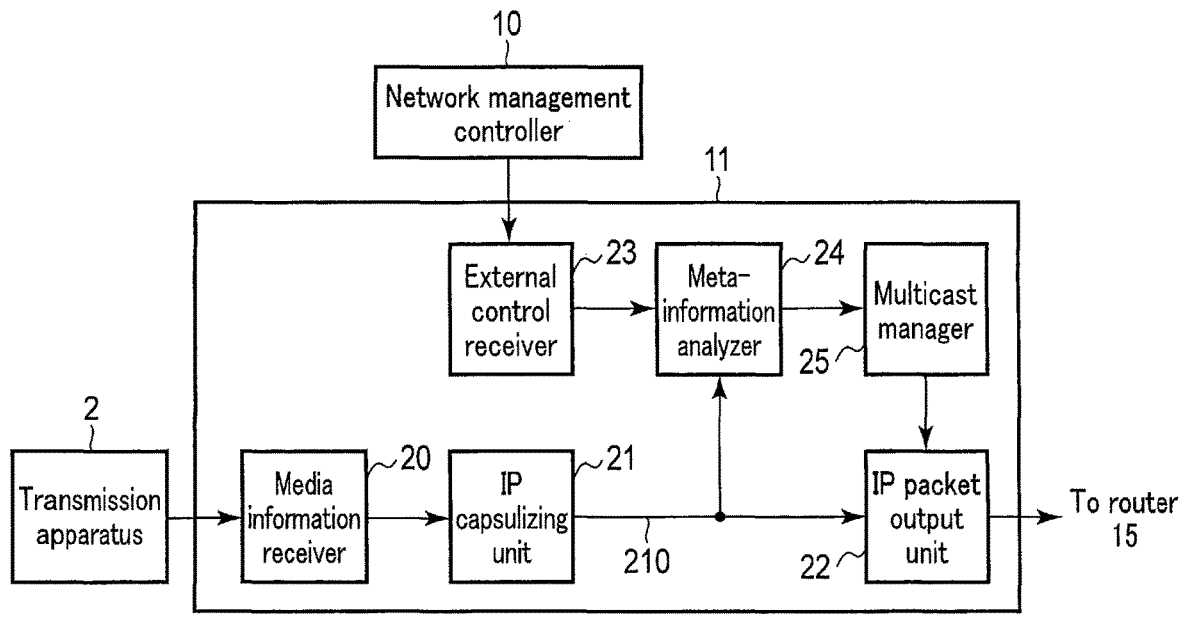
FIG. 2 is a block diagram illustrating a configuration example of an IP gateway on a transmission side according to the first embodiment.

Hereinafter, embodiments will be described with reference to the accompanying drawings.

According to the present embodiment, there is provided a content delivery apparatus applied to a content delivery system which delivers content, which is sent from a transmission apparatus, to a reception apparatus by a multicast method via an IP network. The content delivery apparatus includes an analyzer configured to detect a start point or an end point of the content by analyzing control information of the content, and a manager configured to control a reception start or a reception end of the content, based on the start point or the end point.

First Embodiment

FIG. 1 is a block diagram illustrating a configuration example of a content delivery system of the present embodiment. As illustrated in FIG. 1, this system delivers content, which is sent from a plurality of transmission apparatuses 2 or IP transmission apparatuses 12, to a plurality of reception apparatuses 3 or IP reception apparatuses 14 by a multicast method by using an IP network 1. Each transmission apparatus 2 or IP transmission apparatus 12 is, for example, a video delivery server, and sends digital video data, audio data and ancillary data (these data are comprehensively referred to as "media information") to the IP network 1.

The present system includes, as network devices connected to the IP network 1, transmission-side IP gateways (IP-GW) 11, IP transmission apparatuses 12, reception-side IP gateways (IP-GW) 13, IP reception apparatuses 14, and routers 15.

Further, the present system includes a network management controller 10 which manages and controls the network devices connected to the IP network 1.

Specifically, the network management controller 10 collects information of the IP-GW 11, IP transmission apparatuses 12, IP-GW 13, IP reception apparatuses 14, and routers 15, and manages and controls joining in a multicast group or leaving the multicast group, and content delivery schedules.

The routers 15 are apparatuses which relay data transmission by a multicast method via the IP network 1. The routers 15 communicate with the IP-GW 11, IP transmission apparatuses 12, IP-GW 13 and IP reception apparatuses 14 by using protocols such as IGMP (Internet Group Management Protocol) and MLD (Multicast Listener Discovery), and properly manage the traffic of transmission paths in multicasting.

FIG. 2 is a block diagram illustrating a configuration example of the IP-GW 11 on the transmission side. The IP-GW 11 functions as a content delivery apparatus which delivers content, which is sent from the transmission apparatus 2, to the reception apparatuses 3 and IP reception apparatuses 14 by a multicast method. As illustrated in FIG. 2, the IP-GW 11 includes a media information receiver 20, an IP capsulizing unit 21, an IP packet output unit 22, an external control receiver 23, a meta-information analyzer 24, and a multicast manager 25.

The media information receiver 20 receives media information which is sent from the transmission apparatus 2, and transfers the media information to the IP capsulizing unit 21. The IP capsulizing unit 21 capsulizes the media information from the transmission apparatus 2, and generates an IP packet 210 to which a header part (to be described later) is added.

Figure 4:
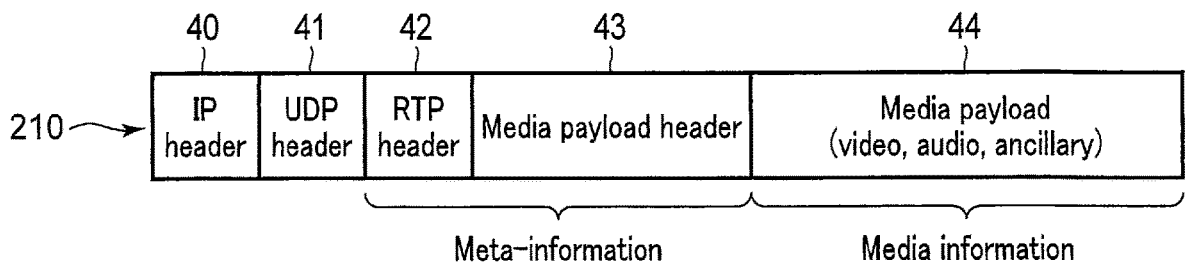
FIG. 4 is a view illustrating an example of an IP packet according to the first embodiment.

FIG. 4 is a view illustrating an example of the IP packet 210. As illustrated in FIG. 4, the IP packet 210 is generally composed of a header part, 40 to 43, and a media payload 44. The header part includes an IP header 40, a UDP (User Datagram Protocol) header 41, an RTP (Real time Transport Protocol) header 42, and a media payload header 43. In the RTP header 42 and media payload header 43, for example, control information stipulated by a standard (SMPTE-ST2022-6) of the SMPTE (Society of Motion Picture and Television Engineers) is stored.

The media payload 44 is a storage area of media information including video data (video stream), audio data (audio) and ancillary data. The ancillary data corresponds to auxiliary data that is to be described later. The auxiliary data includes subtitle data, and, as described below, control information stipulated by a standard (ARIB STD-B39) of the ARIB (Association of Radio Industries and Business).

Referring back to FIG. 2, the IP packet output unit 22 sends the IP packet to the IP network 1 in accordance with the control of the multicast manager 25. Thereby, the router 15 receives the IP packet that is sent from the IP-GW 11, and delivers the IP packet by multicasting.

The external control receiver 23 receives, based on the delivery schedule of content, a sending start instruction or a sending end instruction which is output from the network management controller 10. The meta-information analyzer 24 analyzes meta-information included in the IP packet that is output from the IP capsulizing unit 21, in accordance with the sending start instruction or sending end instruction received by the external control receiver 23. The meta-information is control information which is stored in the RTP header 42 and media payload header 43, as illustrated in FIG. 4.

The meta-information analyzer 24 analyzes the meta-information, and acquires boundary information of video data or the like, which is included in the media information, or timing information thereof. Specifically, in the RTP header 42, for example, control information called "marker bit (M)" and "timestamp" is stored. The marker bit (M) is, for example, information indicative of a start, resume, an end, or the like of a video stream, and "1" is set in the last IP packet of a certain video frame. The timestamp is time information, and is indicative of a sampling start time of a top portion of the media information.

The meta-information analyzer 24 can detect a boundary of a specific video frame, based on the combination of the marker bit (M) and timestamp. Further, in the media payload header 43, for example, control information called "frame count (FR Count)" is stored. This control information is indicative of a count value of a video frame, and is indicative of the position number in the sequence of frames included in the stream. The meta-information analyzer 24 can detect the start point or end point of video data or the like, based on the marker bit (M) and the count value.

The multicast manager 25 controls the IP packet output unit 22, based on the start point of media information detected by the meta-information analyzer 24. The IP packet output unit 22 sends the IP packet to the IP network 1 in accordance with the control of the multicast manager 25. On the other hand, the multicast manager 25 controls the IP packet output unit 22, based on the end point of media information detected by the meta-information analyzer 24. Specifically, the IP packet output unit 22 ends the sending of the IP packet in accordance with the control of the multicast manager 25.

The router 15 receives the IP packet which is sent from the IP-GW 11 via the IP network 1, and executes and manages the relay of multicast transmission.

Figure 3:
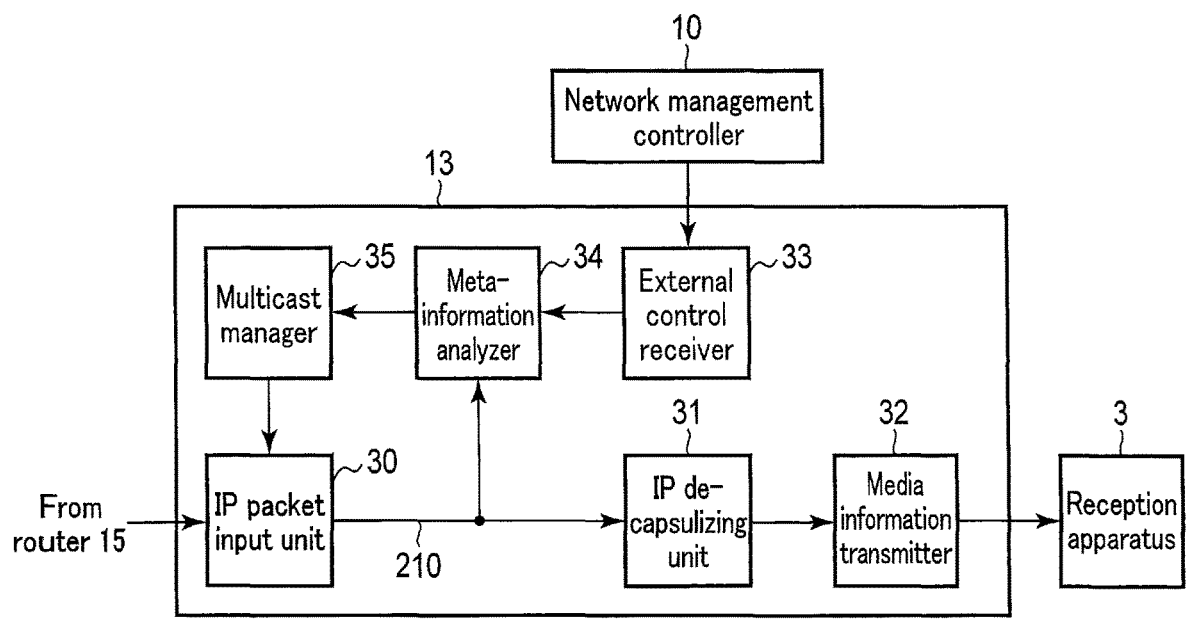
FIG. 3 is a block diagram illustrating a configuration example of an IP gateway on a reception side according to the first embodiment.

FIG. 3 is a block diagram illustrating a configuration example of the IP-GW 13 on the reception side. As illustrated in FIG. 3, the IP-GW 13 includes an IP packet input unit 30, an IP de-capsulizing unit 31, a media information transmitter 32, an external control receiver 33, a meta-information analyzer 34, and a multicast manager 35.

The IP packet input unit 30 receives the IP packet 210 which is multicast-transmitted from the router 15 via the IP network 1, and transfers the IP packet 210 to the IP de-capsulizing 31. The IP de-capsulizing unit 31 converts the IP-capsulized IP packet 210 to the original media information. The media information transmitter 32 transmits the media information to the reception apparatus 3. The reception apparatus 3 is, for example, a digital TV apparatus, a set-top box, a smartphone, a broadcast-related apparatus, or the like.

The external control receiver 33 receives, based on the delivery schedule of content, an instruction for starting/ending the input (reception) of the IP packet, the instruction being output from the network management controller 10. The meta-information analyzer 34 analyzes meta-information included in the IP packet 210, in accordance with the instruction received by the external control receiver 33.

The meta-information analyzer 34 analyzes, in the same manner as described above, the meta-information, and acquires boundary information of video data or the like, which is included in the media information, or timing information thereof. Specifically, the meta-information analyzer 34 detects the start point or end point of video data or the like.

The multicast manager 35 controls the IP packet input unit 30, based on the start point or end point detected by the meta-information analyzer 34. The multicast manager 35 controls the IP packet input unit 30, based on the start point or end point detected by the meta-information analyzer 34. Specifically, the IP packet input unit 30 starts or ends the input (reception) of the IP packet in accordance with the control of the multicast manager 35.

Figure 5:
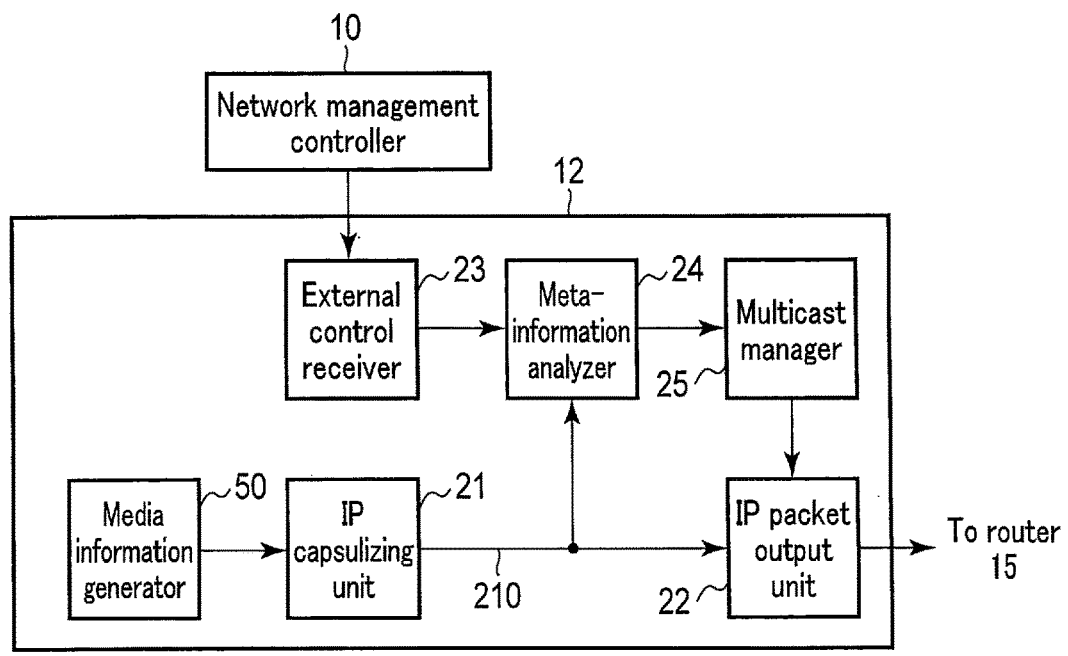
FIG. 5 is a block diagram illustrating a configuration example of an IP transmission apparatus according to the first embodiment.

FIG. 5 is a block diagram illustrating a configuration example of the IP transmission apparatus 12. The IP transmission apparatus 12 is a transmission apparatus including a similar function to the function of the transmission-side IP-GW 11. As illustrated in FIG. 5, the IP transmission apparatus 12 corresponds to the above-described transmission apparatus (video delivery server) 2, and includes a media information generator 50 which generates media information.

Further, like the IP-GW 11, the IP transmission apparatus 12 includes an IP capsulizing unit 21, an IP packet output unit 22, an external control receiver 23, a meta-information analyzer 24, and a multicast manager 25. The IP capsulizing unit 21 IP-capsulizes the media information which is output from the media information generator 50, and generates an IP packet 210.

Figure 6:
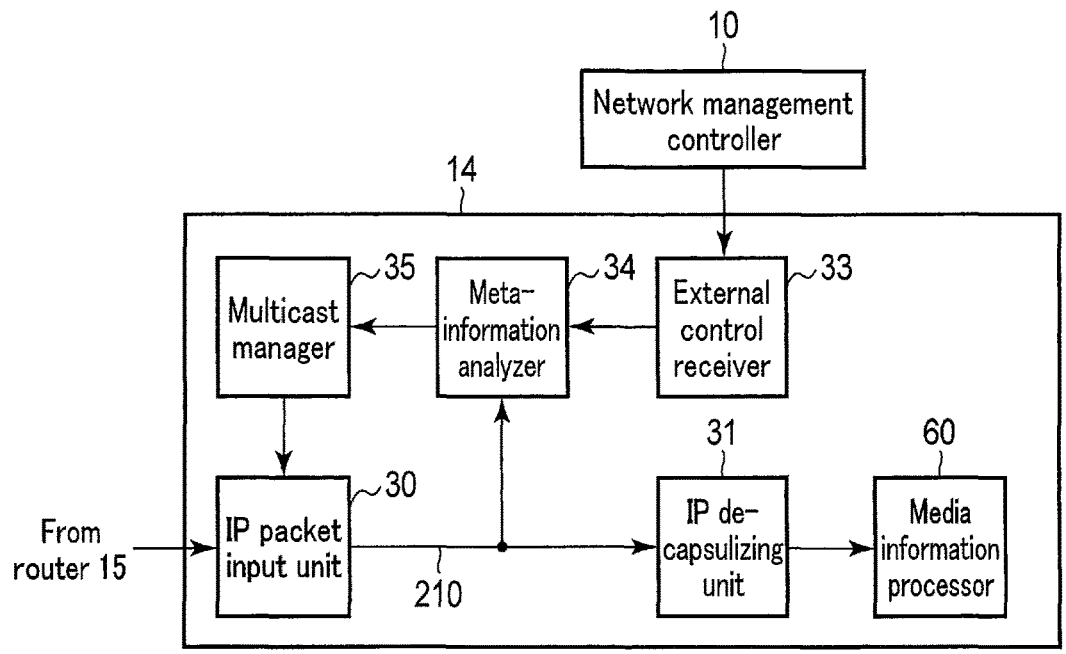
FIG. 6 is a block diagram illustrating a configuration example of an IP reception apparatus according to the first embodiment.

FIG. 6 is a block diagram illustrating a configuration example of the IP reception apparatus 14. The IP reception apparatus is a reception apparatus including a similar function to the function of the reception-side IP-GW 13. As illustrated in FIG. 6, the IP reception apparatus 14 includes a media information processor 60, and further includes, like the IP-GW 13, an IP packet input unit 30, an IP de-capsulizing unit 31, an external control receiver 33, a meta-information analyzer 34, and a multicast manager 35. The original media information, to which the IP packet 210 is converted by the IP de-capsulizing unit 31, is input to the media information processor 60, and the media information processor 60 executes, for example, a process for displaying the media information on a screen of a display.

(Operation of the System)

Figure 7A:
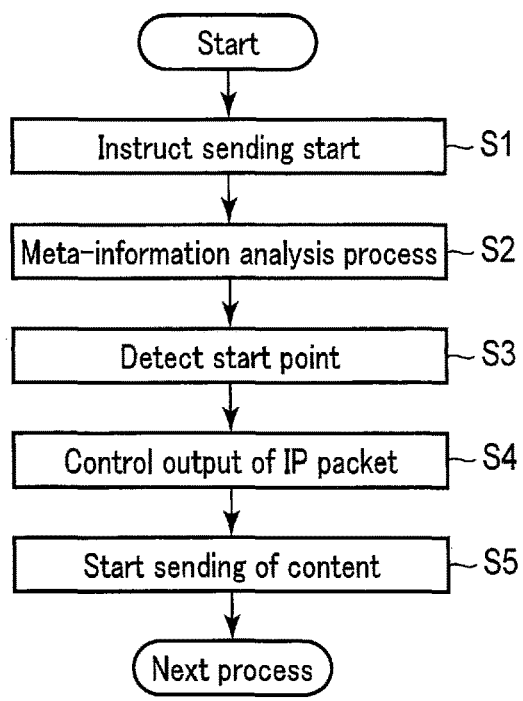
FIG. 7A is a flowchart for describing a process on the transmission side at a time of starting content delivery according to the first embodiment.
Figure 7B:
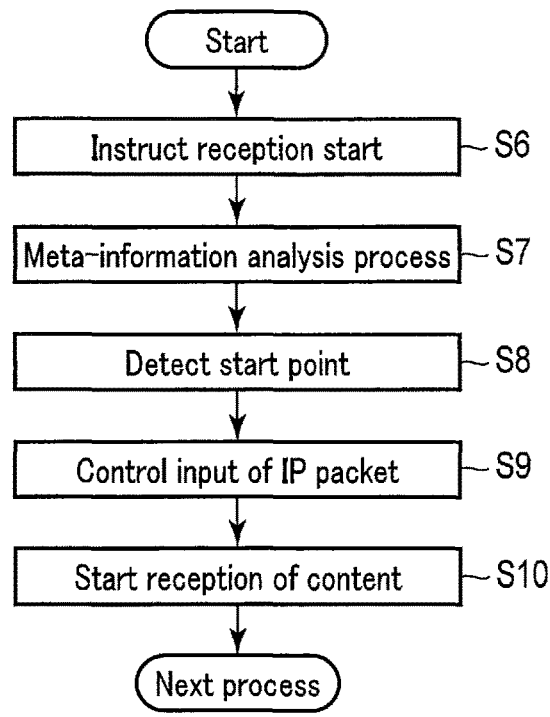
FIG. 7B is a flowchart for describing a process on the reception side at a time of starting content delivery according to the first embodiment.
Figure 8A:
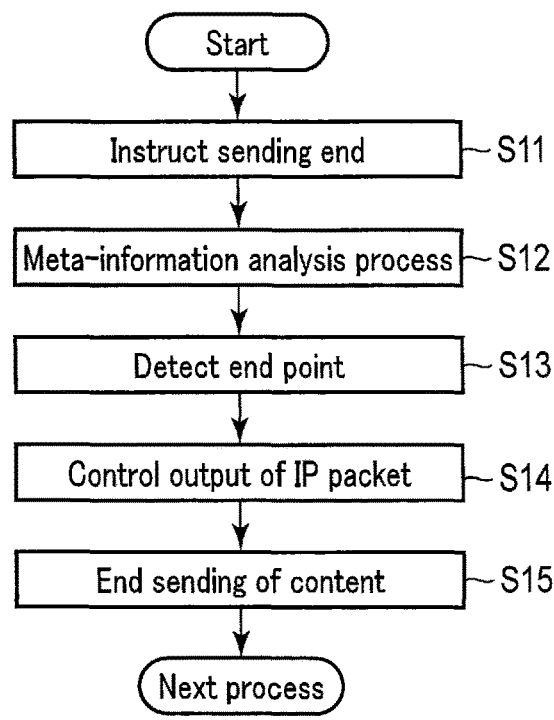
FIG. 8A is a flowchart for describing a process on the transmission side at a time of ending content delivery according to the first embodiment.
Figure 8B:
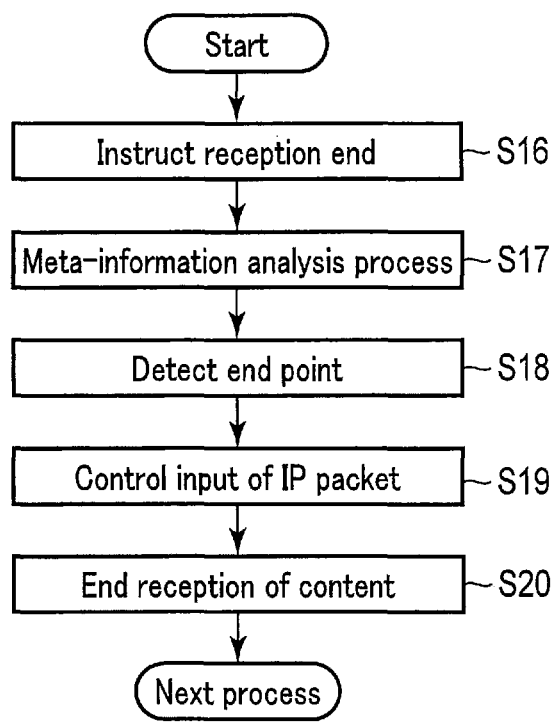
FIG. 8B is a flowchart for describing a process on the reception side at a time of ending content delivery according to the first embodiment.
Figure 9A:
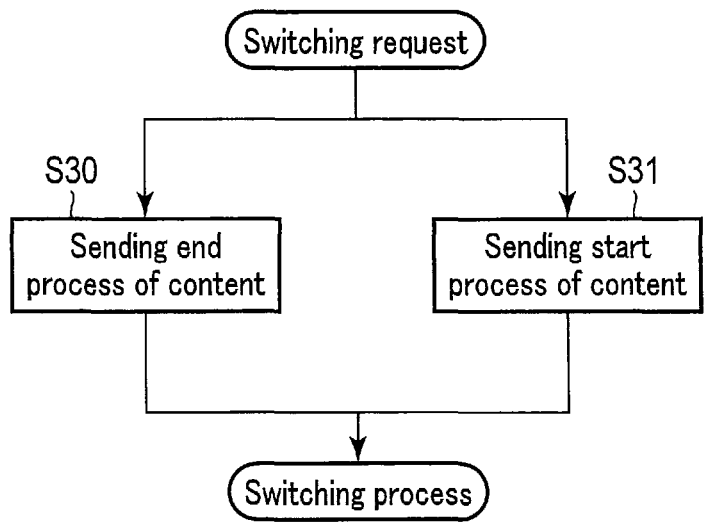
FIG. 9A is a flowchart for describing a process at a time of switching on the transmission side of content delivery according to the first embodiment.
Figure 9B:
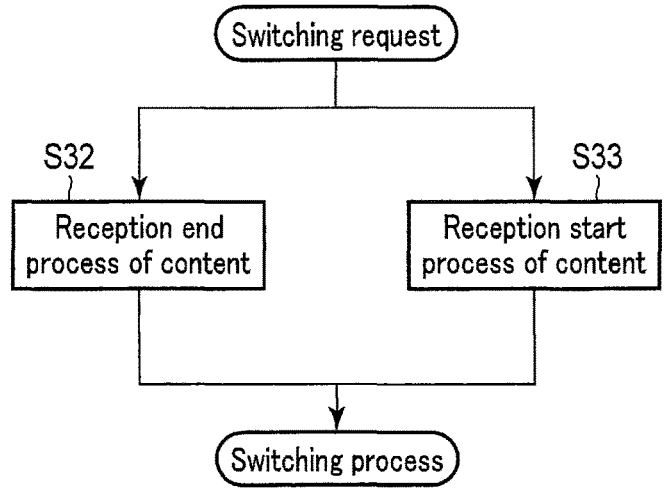
FIG. 9B is a flowchart for describing a process at a time of switching on the reception side of content delivery according to the first embodiment.

An operation of a content delivery process of the present embodiment will be described. FIG. 7A is a flowchart for describing a process on the transmission side at a time of starting content delivery. FIG. 7B is a flowchart for describing a process on the reception side at a time of starting content delivery. FIG. 8A is a flowchart for describing a process on the transmission side at a time of ending content delivery. FIG. 8B is a flowchart for describing a process on the reception side at a time of ending content delivery. FIG. 9A is a flowchart for describing a switching process on the transmission side of content delivery. FIG. 9B is a flowchart for describing a switching process on the reception side of content delivery.

As illustrated in FIG. 7A, at the time of starting content delivery, on the transmission side, the network management controller 10 executes a sending start instruction to a predetermined IP-GW 11, based on the delivery schedule of content (S1).

The meta-information analyzer 24 analyzes meta-information included in the IP packet 210 that is capsulized by the IP capsulizing unit 21, in accordance with the sending start instruction received by the external control receiver 23 (S2).

The meta-information analyzer 24 detects the start point of media information (video stream or the like), based on the control information composed of, for example, a combination of the marker bit (M) and timestamp included in the meta-information (S3).

The multicast manager 25 controls the IP packet output unit 22, based on the start point detected by the meta-information analyzer 24 (S4).

In accordance with the control by the multicast manager 25, the IP packet output unit 22 sends the IP packet to the IP network 1 (S5). The router 15 receives the IP packet which is sent from the IP-GW 11, and executes relay of multicast transmission via the IP network 1.

On the other hand, as illustrated in FIG. 7B, at the time of starting content delivery, on the reception side, the network management controller 10 executes a reception start instruction of the IP packet to a predetermined IP-GW 13, based on the delivery schedule of content (SG).

The meta-information analyzer 34 analyzes meta-information included in the IP packet 210 that is output from the IP packet input unit 30, in accordance with the reception start instruction received by the external control receiver 33 (S7), and detects the start point of video data or the like (S8).

The multicast manager 35 controls the IP packet input unit 30, based on the start point detected by the meta-information analyzer 34 (S9).

In accordance with the control by the multicast manager 35, the IP packet input unit 30 receives the IP packet 210 which is multicast-transmitted from the router 15, and transfers the IP packet 210 to the IP de-capsulizing unit 31. The IP de-capsulizing unit 31 converts the IP packet 210, which is transferred from the IP packet input unit 30, to the original media information, and outputs the original media information to the media information transmitter 32. The media information transmitter 32 sends the converted media information to the reception apparatus 3 (S10).

Next, as illustrated in FIG. 8A, at a time of ending content delivery, on the transmission side, the network management controller 10 executes a sending end instruction to a predetermined IP-GW 11, based on the delivery schedule of content (S11).

The meta-information analyzer 24 analyzes meta-information included in the IP packet 210 from the IP capsulizing unit 21, in accordance with the sending end instruction received by the external control receiver 23 (S12). In the same manner as described above, the meta-information analyzer 24 detects the end point of media information, based on the control information included in the meta-information (S13).

The multicast manager 25 controls the IP packet output unit 22, based on the end point detected by the meta-information analyzer 24 (S14). In accordance with the control by the multicast manager 25, the IP packet output unit 22 ends the sending of the IP packet (S15). Specifically, the router 15 ends the reception of the IP packet by multicast transmission, from the IP-GW 11 to which the sending end instruction is executed.

On the other hand, as illustrated in FIG. 8B, at the time of ending content delivery, on the reception side, the network management controller 10 executes a reception end instruction of the IP packet to a predetermined IP-GW 13, based on the delivery schedule of content (S16).

In accordance with the reception end instruction received by the external control receiver 33, the meta-information analyzer 34 analyzes meta-information included in the IP packet 210 that is output from the IP packet input unit 30 (S17) and detects the end point of video data or the like (S18).

The multicast manager 35 controls the IP packet input unit 30, based on the end point detected by the meta-information analyzer 34 (S19).

In accordance with the control by the multicast manager 35, the IP packet input unit 30 ends the reception of the IP packet 210 which is multicast-transmitted from the router 15 (S20).

As illustrated in FIG. 9A, a switching process on the transmission side of content delivery can be realized by executing in parallel the content sending end process (S30) illustrated in FIG. 8A and the content sending start process (S31) illustrated in FIG. 7A. The content sending end process (S30) and the content sending start process (S31) are executed by each of the IP-GW 11 and IP transmission apparatus 12, based on an instruction from the network management controller 10.

Similarly, as illustrated in FIG. 9B, a switching process on the reception side of content delivery can be realized by executing in parallel the content reception end process (S32) illustrated in FIG. 8B and the content reception start process (S33) illustrated in FIG. 7B. The content reception end process (S32) and the content reception start process (S33) are executed by each of the IP-GW 13 and IP reception apparatus 14, based on an instruction from the network management controller 10.

Figure 10:
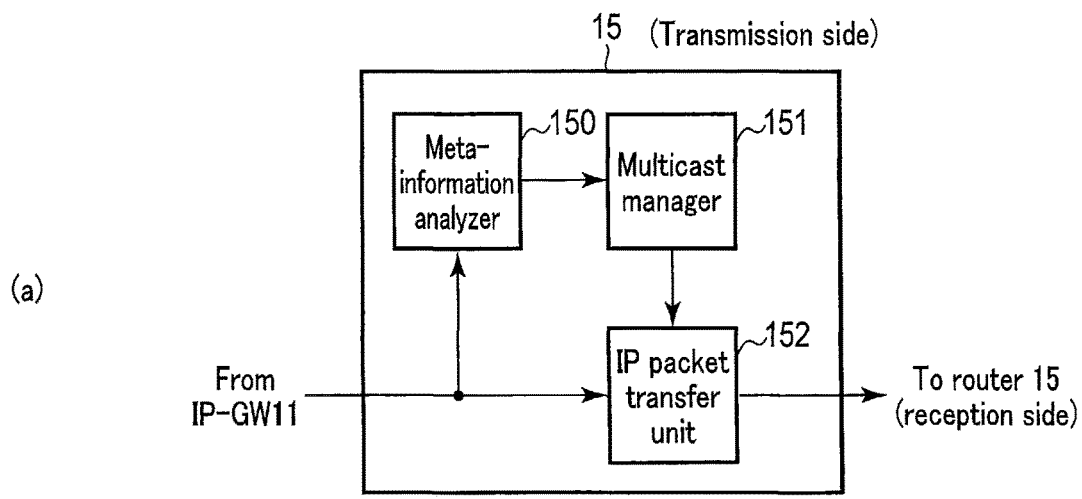
FIG. 10 is a block diagram for describing a modification of the first embodiment.
Figure 10:
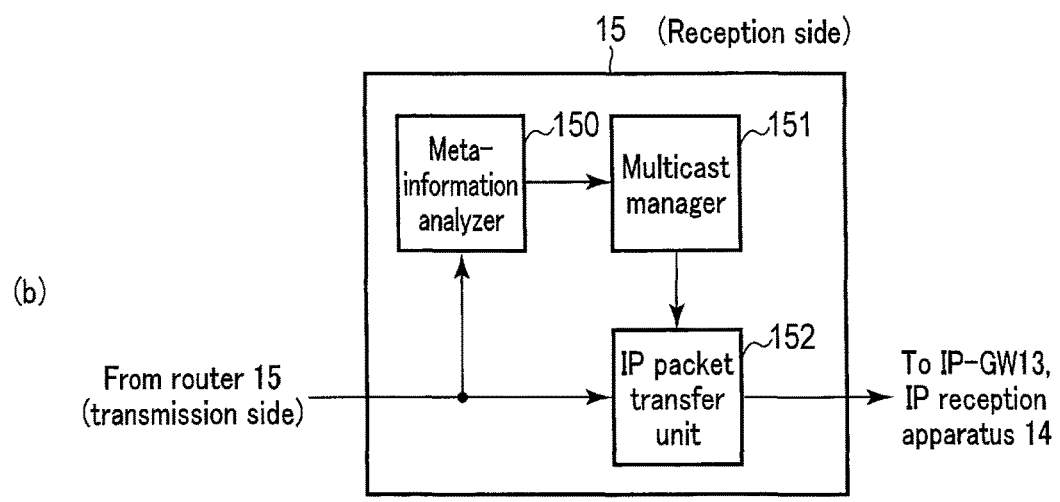

FIG. 10 is a block diagram illustrating a modification of the present embodiment. In this modification, as illustrated in part (a) of FIG. 10, the transmission-side router 15 is configured to include a meta-information analyzer 150 similar to the above-described meta-information analyzer 24, a multicast manager 151 similar to the multicast manager 25, and an IP packet transfer unit 152 similar to the IP packet output unit 22. In addition, as illustrated in part (b) of FIG. 10, the reception-side router 15 is configured to include a meta-information analyzer 150 similar to the above-described meta-information analyzer 34, a multicast manager 151 similar to the multicast manager 35, and an IP packet transfer unit 152 similar to the IP packet input unit 30. Thereby, the transmission-side router 15 can control the start or end of multicast transmission of an IP packet, based on the start point or end point detected by the meta-information analyzer 150. In addition, the reception-side router 15 can control the start or end of multicast reception of an IP packet, based on the start point or end point detected by the meta-information analyzer 150.

As has been described above, according to the system of the first embodiment, the actual start point and end point of sending of media information can be detected by acquiring the boundary of media information or the timing information from the control information of the IP packet, in accordance with the instructions of the start and end of content delivery from the network management controller 10. Thereby, in the system of the present embodiment, it is possible to avoid such a situation that valid data in media information, which is transmitted on the IP network, is missing, or invalid data is mixed, due to a delay or jitter in the transmission on the IP network, as will be described later.

Hereinafter, referring to FIG. 11 and FIG. 12, a description will be given of a case in which the content delivery end or content delivery start is controlled in accordance with an instruction by time designation from the network management controller 10. Here, it is assumed that a delay or jitter exists on an actual transmission path on the IP network.

FIG. 11 illustrates a case in which a content delivery start is instructed at a designated time T from the network management controller 10. Part (A) of FIG. 11 illustrates a transmission timing of media information on a transmission path A. In this case, if the transmission timing is later than the designated time T, there occurs a situation in which invalid data 310 is mixed at a starting part of valid data 300. Part (B) of FIG. 11 illustrates a transmission timing of media information on a transmission path B. In this case, if the transmission timing is earlier than the designated time T, there occurs a situation in which valid data 320, which is to be included in the valid data 300, is missing.

On the other hand, FIG. 12 illustrates a case in which a content delivery end is instructed at a designated time T from the network management controller 10. Part (A) of FIG. 12 illustrates a transmission timing of media information on a transmission path A. In this case, if the transmission timing is later than the designated time T, there occurs a situation in which valid data 320, which is to be included in valid data 300, is missing. Part (B) of FIG. 12 illustrates a transmission timing of media information on a transmission path B. In this case, if the transmission timing is earlier than the designated time T, there occurs a situation in which invalid data 310 is mixed.

According to the system of the present embodiment, even when a delay or jitter exists in the transmission on the IP network, the actual start point and end point of sending of media information can be detected. Therefore, in the content delivery, media information can be seamlessly transmitted, while avoiding missing of valid data or mixing of invalid data.

Second Embodiment

A second embodiment will be described with reference to the accompanying drawings. In the present embodiment, since the configuration of the system is the same as illustrated in FIG. 1, a description thereof is omitted.

FIG. 13A is a block diagram illustrating a configuration example of an IP gateway on the transmission side according to a second embodiment.

As illustrated in FIG. 13A, the IP-GW 11 in the present embodiment is configured to include an auxiliary data analyzer 110 in place of, for example, the meta-information analyzer 24 illustrated in FIG. 2. The auxiliary data analyzer 110 analyzes auxiliary data of media information, which is included in the IP packet 210 that is output from the IP capsulizing unit 21, in accordance with a sending start instruction or a sending end instruction received by the external control receiver 23. The auxiliary data includes control information stipulated by a standard (SMPTE ST2110-40) of the SMPTE (Society of Motion Picture and Television Engineers).

The auxiliary data analyzer 110 detects the start point and end point of media information, as described above, by analyzing the auxiliary data. Thereby, the multicast manager 25 controls the IP packet output unit 22, based on the start point or end point of media information detected by the auxiliary data analyzer 110.

FIG. 13B is a block diagram illustrating a configuration example of an IP gateway on the reception side according to the second embodiment.

As illustrated in FIG. 13B, the IP-GW 13 in the present embodiment is configured to include an auxiliary data analyzer 130 in place of, for example, the meta-information analyzer 34 illustrated in FIG. 3. The auxiliary data analyzer 130 analyzes auxiliary data of media information, which is included in the IP packet 210 that is output from the IP input unit 30, in accordance with a reception start instruction or a reception end instruction received by the external control receiver 33. The auxiliary data includes control information stipulated by a standard (SMPTE ST2110-40) of the SMPTE (Society of Motion Picture and Television Engineers).

The auxiliary data analyzer 130 detects the start point and end point of media information, as described above, by analyzing the auxiliary data. Thereby, the multicast manager 35 controls the IP packet input unit 30, based on the start point or end point of media information detected by the auxiliary data analyzer 130.

FIG. 14A is a block diagram illustrating a configuration example of an IP gateway on the transmission side according to the second embodiment.

As illustrated in FIG. 14A, in the IP-GW 11 in the present embodiment, the auxiliary data analyzer 110 may analyze auxiliary data included in media information which is not yet capsulized by the IP capsulizing unit 21. The auxiliary data includes, for example, control information called "inter-stationary control data" stipulated by a standard (ARIB STD-B39) of the ARIB (Association of Radio Industries and Business). The inter-stationary control data includes, for example, control information, such as "count-up", "count-down" and "trigger", as information indicative of a switching timing of a video signal.

FIG. 14B is a block diagram illustrating a configuration example of an IP gateway on the reception side according to the second embodiment.

As illustrated in FIG. 14B, in the IP-GW 13 in the present embodiment, the auxiliary data analyzer 130 may analyze auxiliary data included in media information which was de-capsulized by the IP de-capsulizing unit 31. The auxiliary data includes, for example, control information called "inter-stationary control data" stipulated by a standard (ARIB STD-B39) of the ARIB (Association of Radio Industries and Business). The inter-stationary control data includes, for example, control information, such as "count-up", "count-down" and "trigger", as information indicative of a switching timing of a video signal.

(Modification 1)

FIG. 15A is a block diagram illustrating a configuration example of an IP transmission apparatus 12 according to Modification 1 of the present embodiment.

As illustrated in FIG. 15A, the IP transmission apparatus 12 of the present modification is, like the IP-GW 11 illustrated in FIG. 13A, configured to include an auxiliary data analyzer 160 which analyzes auxiliary data of media information, which is included in the IP packet 210 that is output from the IP capsulizing unit 21.

Further, the IP transmission apparatus 12 of the present modification is configured to include, as a media information generator corresponding to the above-described transmission apparatus 2, a media information generator 161 having a function of adding control information, which is boundary information of an end point or start point or timing information thereof, to an area of the auxiliary data.

The media information generator 161 generates and outputs media information in which the control information is added to the auxiliary data, in accordance with an instruction from the network management controller 10. The auxiliary data analyzer 160 constantly monitors the auxiliary data of the media information included in the IP packet 210, without the instruction from the network management controller 10 as in the above-described case. The multicast manager 25 controls the IP packet output unit 22, based on the start point or end point of media information detected by the auxiliary data analyzer 160.

FIG. 15B is a block diagram illustrating a configuration example of an IP reception apparatus 14 according to Modification 1 of the present embodiment.

As illustrated in FIG. 15B, like the IP-GW 13 illustrated in FIG. 13B, the IP reception apparatus 14 of the present modification is configured to include an auxiliary data analyzer 130 which analyzes auxiliary data of media information, which is included in the IP packet 210 that is output from the IP input unit 30.

The media information processor 60 processes media information in accordance with an instruction from the network management controller 10. The auxiliary data analyzer 130 constantly monitors the auxiliary data of the media information included in the IP packet 210. An IP reception manager 36 controls the IP packet input unit 30, based on the start point or end point of media information detected by the auxiliary data analyzer 130, without an instruction from the network management controller 10.

(Modification 2)

Figure 16A:
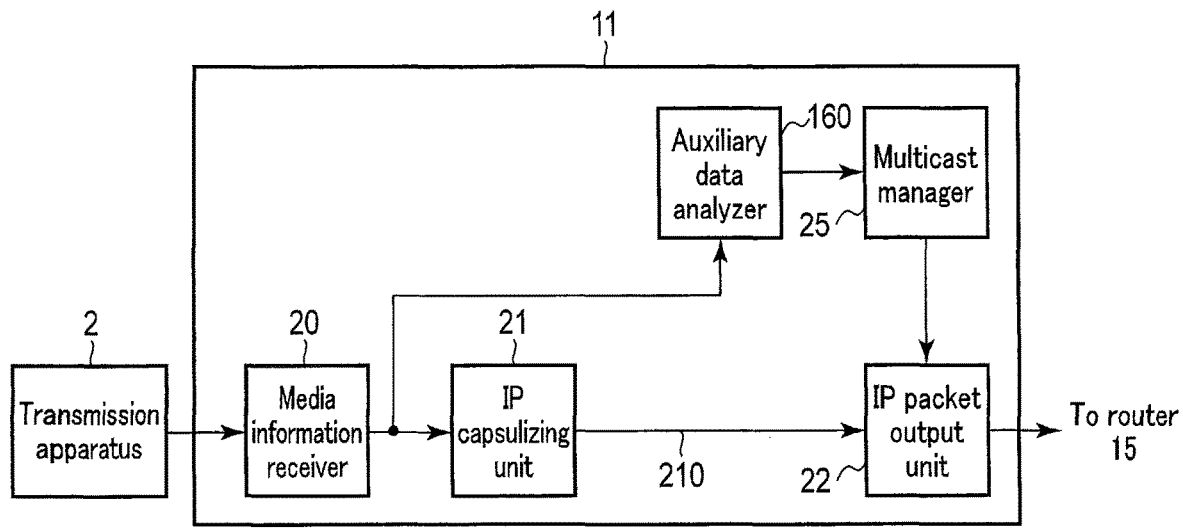
FIG. 16A is a block diagram illustrating a configuration example of an IP gateway on the transmission side according to Modification 2 of the second embodiment.

FIG. 16A is a block diagram illustrating a configuration example of an IP gateway on the transmission side according to Modification 2 of the present embodiment.

As illustrated in FIG. 16A, the IP-GW 11 of the present modification is configured to include an auxiliary data analyzer 160 which constantly monitors auxiliary data of media information and analyzes the auxiliary data.

In the present modification, the media information receiver 20 receives, as media information which is sent from the transmission apparatus 2, media information in which control information that is boundary information of an end point or a start point, or timing information thereof, is included in an area of the auxiliary data. The media information receiver 20 transfers the received media information to the IP capsulizing unit 21.

The auxiliary data analyzer 160 constantly monitors and analyzes the auxiliary data of the media information. Accordingly, the auxiliary data analyzer 160 can detect the start point or end point of media information, based on the control information of the auxiliary data, without receiving an instruction from the network management controller 10. Thereby, the multicast manager 25 controls the IP packet output unit 22, based on the start point or end point of media information detected by the auxiliary data analyzer 160.

Figure 16B:
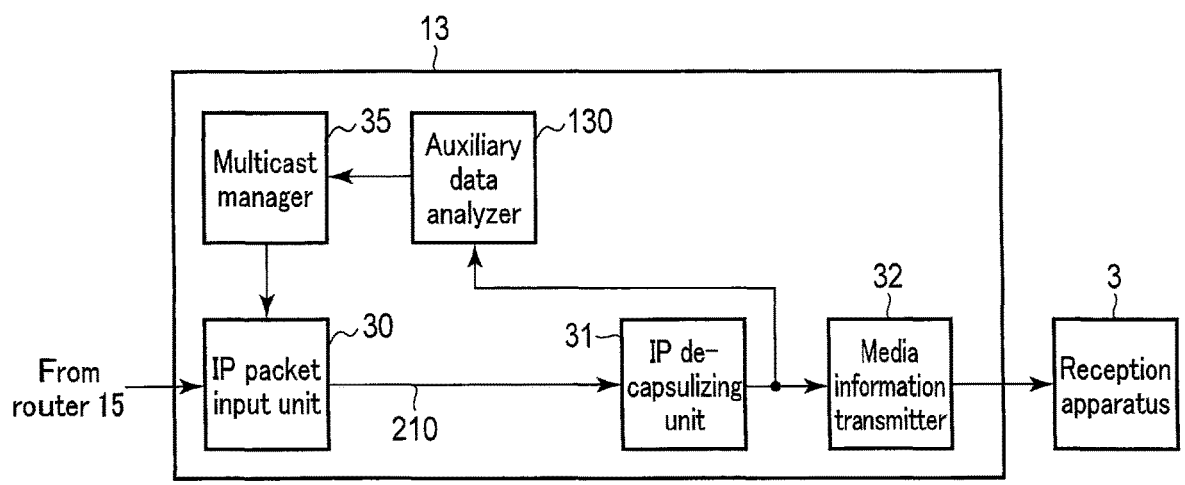
FIG. 16B is a block diagram illustrating a configuration example of an IP gateway on the reception side according to Modification 2 of the second embodiment.

FIG. 16B is a block diagram illustrating a configuration example of an IP gateway on the reception side according to Modification 2 of the present embodiment.

As illustrated in FIG. 16B, the IP-GW 13 of the present modification is configured to include an auxiliary data analyzer 130 which constantly monitors auxiliary data of media information and analyzes the auxiliary data.

In the present modification, the IP packet input unit 30 receives, as media information which is sent from the router 15, media information in which control information that is boundary information of an end point or a start point, or timing information thereof, is included in an area of the auxiliary data. The IP packet input unit 30 transfers the received media information to the IP de-capsulizing unit 31. The IP de-capsulizing unit 31 de-capsulizes the media information and outputs the media information to the media information transmitter 32.

The auxiliary data analyzer 130 constantly monitors and analyzes the auxiliary data of the media information which is output from the IP de-capsulizing unit 31. Accordingly, the auxiliary data analyzer 130 can detect the start point or end point of media information, based on the control information of the auxiliary data, without receiving an instruction from the network management controller 10. Thereby, the multicast manager 35 controls the IP packet input unit 30, based on the start point or end point of media information detected by the auxiliary data analyzer 130.

In this manner, in the systems to which the present embodiment and Modifications 1 and 2 are applied, like the system of the above-described first embodiment, even when a delay or jitter exists in the transmission on the IP network, media information can be seamlessly transmitted in the content delivery, while avoiding missing of valid data or mixing of invalid data. Thereby, seamless transmission and reception of media information can be performed between the transmission side and the reception side.

Third Embodiment

A third embodiment will be described. In the present embodiment, since the configuration of the system is the same as illustrated in FIG. 1, a description thereof is omitted, and only different points from the first and second embodiments will be described.

Figure 17:
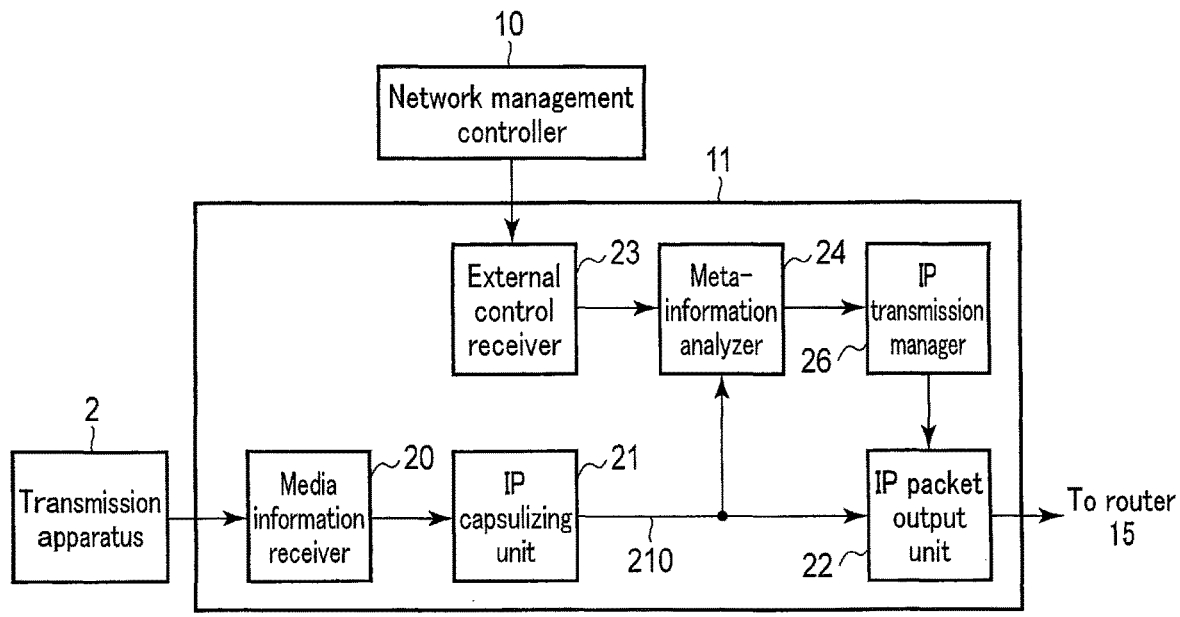
FIG. 17 is a block diagram illustrating a configuration example of an IP gateway on the transmission side according to a third embodiment.

FIG. 17 is a block diagram illustrating a configuration example of an IP gateway on the transmission side according to a third embodiment.

As illustrated in FIG. 17, the IP-GW 11 in this embodiment is configured to include an IP transmission manager 26 in place of the multicast manager 25 in the IP-GW 11 illustrated in FIG. 2.

The IP transmission manager 26 controls the IP packet output unit 22, based on the start point of media information detected by the meta-information analyzer 24, so as to start the transmission of a predetermined IP packet. In accordance with the control of the IP transmission manager 26, the IP packet output unit 22 starts the sending of the predetermined IP packet to the IP network 1 (router 15).

On the other hand, the IP transmission manager 26 controls the IP packet output unit 22, based on the end point of media information detected by the meta-information analyzer 24, so as to end the transmission of the predetermined IP packet. In accordance with the control of the IP transmission manager 26, the IP packet output unit 22 ends the sending of the predetermined IP packet to the IP network 1 (router 15).

Figure 18:
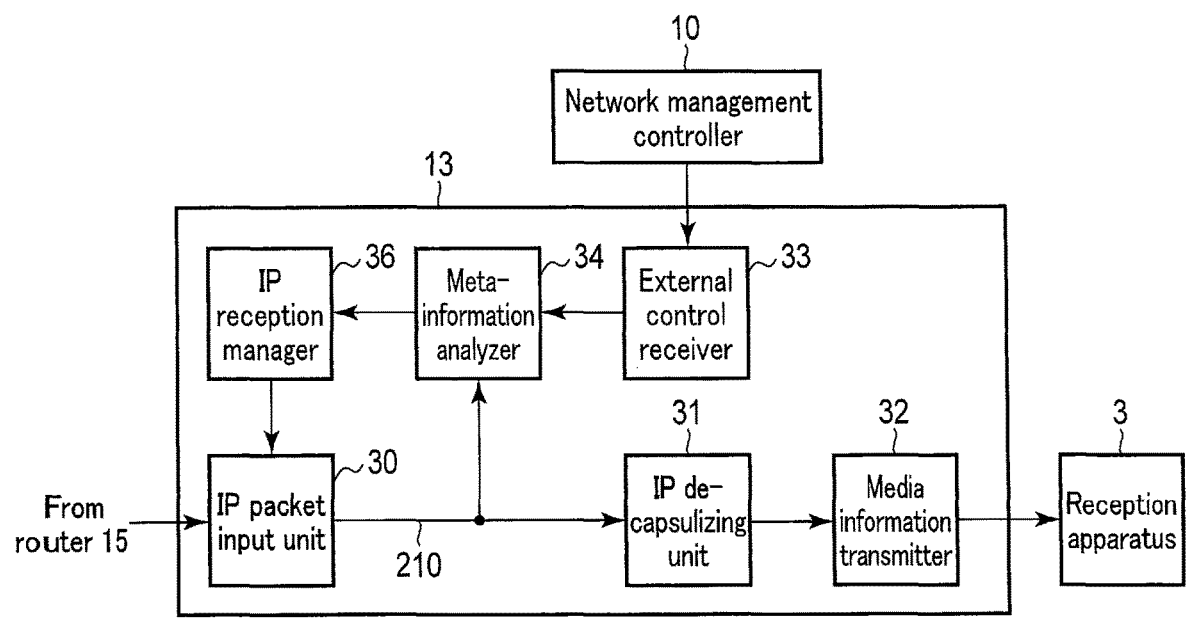
FIG. 18 is a block diagram illustrating a configuration example of an IP gateway on the reception side according to the third embodiment.

FIG. 18 is a block diagram illustrating a configuration example of an IP gateway on the reception side according to the third embodiment.

As illustrated in FIG. 18, the IP-GW 13 in the present embodiment is configured to include an IP reception manager 36 in place of the multicast manager 35 in the IP-GW 13 illustrated in FIG. 3.

The IP reception manager 36 controls the IP packet input unit 30, based on the start point or end point detected by the meta-information analyzer 34, so as to start or end the reception of a predetermined IP packet. Specifically, the IP packet input unit 30 starts or ends the input (reception) of the predetermined IP packet in accordance with the control of the IP reception manager 36.

FIG. 19 is a block diagram illustrating a configuration example of an IP transmission apparatus in the third embodiment.

As illustrated in FIG. 19, the IP transmission apparatus 12 in this embodiment is configured to include an IP transmission manager 26 in place of the multicast manager 25 in the IP transmission apparatus 12 illustrated in FIG. 5.

In this manner, the IP transmission manager 26 described with reference to FIG. 17 can similarly be applied to the IP transmission apparatus 12.

FIG. 20 is a block diagram illustrating a configuration example of an IP reception apparatus in the third embodiment.

As illustrated in FIG. 20, the IP reception apparatus 14 in the present embodiment is configured to include an IP reception manager 36 in place of the multicast manager 35 in the IP reception apparatus 14 illustrated in FIG. 6.

In this manner, the IP reception manager 36 described with reference to FIG. 18 can similarly be applied to the IP reception apparatus 14.

(Operation of the System)

Figure 21A:
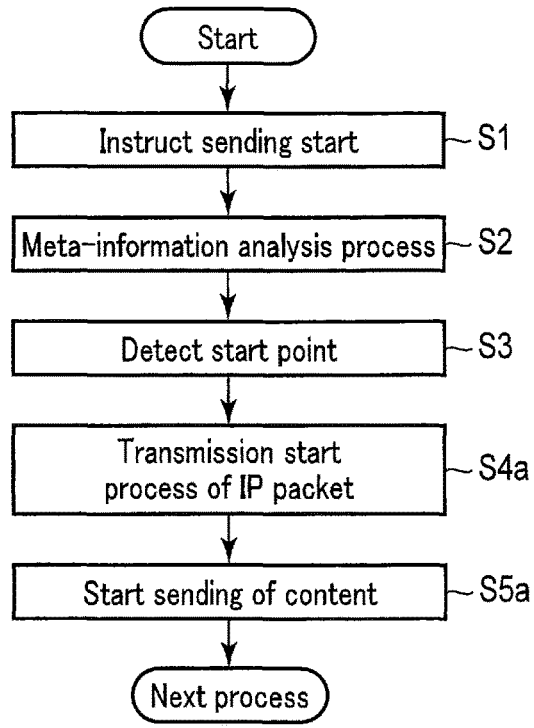
FIG. 21A is a flowchart for describing a process at a time of starting content delivery according to the third embodiment.

FIG. 21A is a flowchart for describing a process at a time of starting content delivery according to the third embodiment.

In the flowchart of FIG. 21A, the processes, which have already been described with reference to the flowchart of FIG. 7A, are denoted by the same step numbers as in the flowchart of FIG. 7A.

Thus, in the flowchart of FIG. 21A, a description of the already described processes is omitted, and steps S4a and S5a, which are different steps, will be described below.

In step S4a, the IP transmission manager 26 controls the IP packet output unit 22, based on the start point detected by the meta-information analyzer 24 in step S3, so as to start the transmission of a predetermined IP packet (S4a).

Then, in step S5a, in accordance with this control, the IP packet output unit 22 sends the predetermined IP packet to the IP network 1 (router 15) (S5a).

The router 15 executes relay of multicast transmission via the IP network 1, by receiving a predetermined IP packet which is sent from the IP-GW 11, and transmitting the predetermined IP packet to a predetermined IP-GW 13.

Figure 21B:
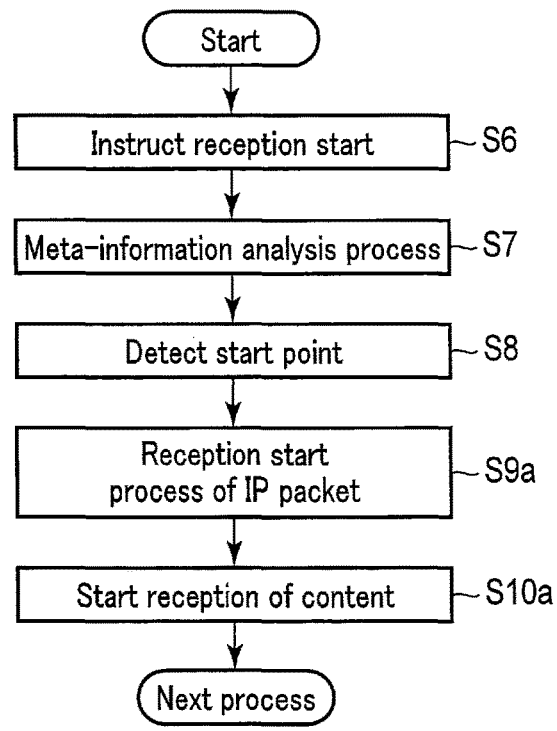
FIG. 21B is a flowchart for describing a process at a time of starting content reception according to the third embodiment.

FIG. 21B is a flowchart for describing a process at a time of starting content reception according to the third embodiment.

In the flowchart of FIG. 21B, the processes, which have already been described with reference to the flowchart of FIG. 7B, are denoted by the same step numbers as in the flowchart of FIG. 7B.

Thus, in the flowchart of FIG. 21B, a description of the already described processes is omitted, and steps S9a and S10a, which are different steps, will be described below.

In step S9a, the IP reception manager 36 controls the IP packet input unit 30, based on the start point detected by the meta-information analyzer 34 in step S8, so as to start the reception of a predetermined IP packet (S9a).

Then, in accordance with the control by the IP reception manager 36, the IP packet input unit 30 receives the IP packet 210 which is multicast-transmitted from the router 15, and transfers the IP packet 210 to the IP de-capsulizing unit 31. The IP de-capsulizing unit 31 converts the IP packet 210, which is transferred from the IP packet input unit 30, to the original media information, and outputs the original media information to the media information transmitter 32. The media information transmitter 32 sends the converted media information to the reception apparatus 3 (S10a).

Figure 22A:
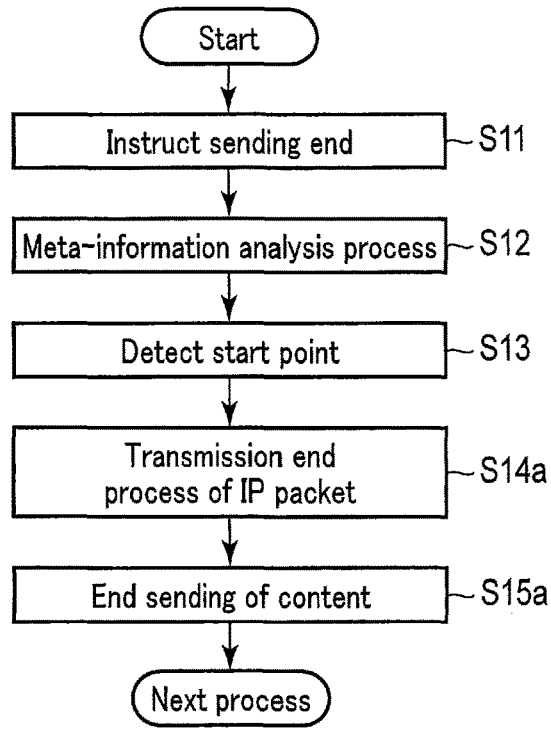
FIG. 22A is a flowchart for describing a process at a time of ending content delivery according to the third embodiment.

FIG. 22A is a flowchart for describing a process at a time of ending content delivery.

Also in the flowchart of FIG. 22A, the processes, which have already been described with reference to the flowchart of FIG. 8A, are denoted by the same step numbers as in the flowchart of FIG. 8A.

Thus, also in the flowchart of FIG. 22A, a description of the already described processes is omitted, and steps S14a and S15a, which are different steps, will be described below.

In step S14a, the IP transmission manager 26 controls the IP packet output unit 22, based on the end point detected by the meta-information analyzer 24 in step S13, so as to end the transmission of a predetermined IP packet (S14a).

Then, in step S15a, in accordance with this control, the IP packet output unit 22 ends the sending of the predetermined IP packet to the IP network 1 (router 15) (S15a).

Figure 22B:
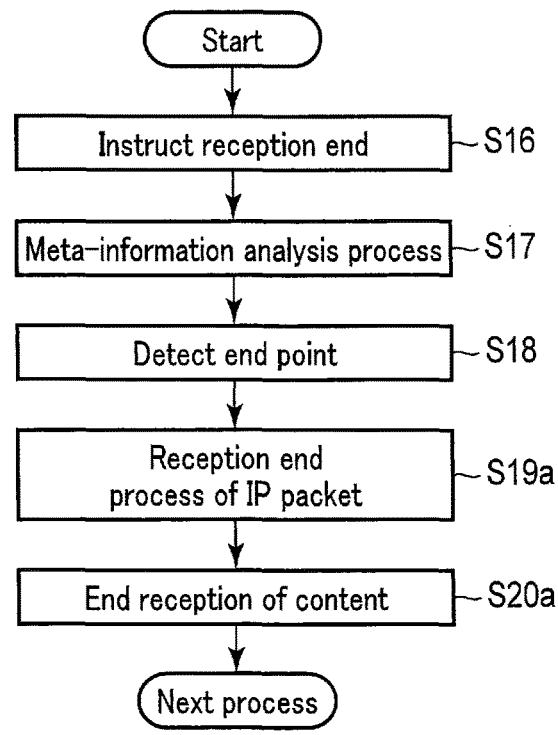
FIG. 22B is a flowchart for describing a process at a time of ending content reception according to the third embodiment.

FIG. 22B is a flowchart for describing a process at a time of ending content reception.

Also in the flowchart of FIG. 22B, the processes, which have already been described with reference to the flowchart of FIG. 8B, are denoted by the same step numbers as in the flowchart of FIG. 8B.

Thus, also in the flowchart of FIG. 22B, a description of the already described processes is omitted, and steps S19a and S20a, which are different steps, will be described below.

In step S19a, the IP reception manager 36 controls the IP packet input unit 30, based on the end point detected by the meta-information analyzer 34 in step S18, so as to end the reception of a predetermined IP packet (S19a).

Then, in step S20a, in accordance with the control of the IP reception manager 36, the IP packet input unit 30 ends the reception of the IP packet 210 which is multicast-transmitted from the router 15 (S20a).

The switching process of content delivery is as described with reference to FIG. 9A and FIG. 9B.

As described above, according to the system of the present embodiment, the actual start point and end point of sending of media information can be detected by acquiring the boundary of media information or the timing information from the control information of the IP packet, in accordance with the instructions of the start and end of content delivery from the network management controller 10. Thereby, in the system of the present embodiment, it is possible to avoid such a situation that valid data in media information, which is transmitted on the IP network, is missing, or invalid data is mixed, due to a delay or jitter in the transmission on the IP network.

Fourth Embodiment

A fourth embodiment will be described. In the present embodiment, since the configuration of the system is the same as illustrated in FIG. 1, a description thereof is omitted, and only different points from the first and second embodiments will be described below.

Figure 23:
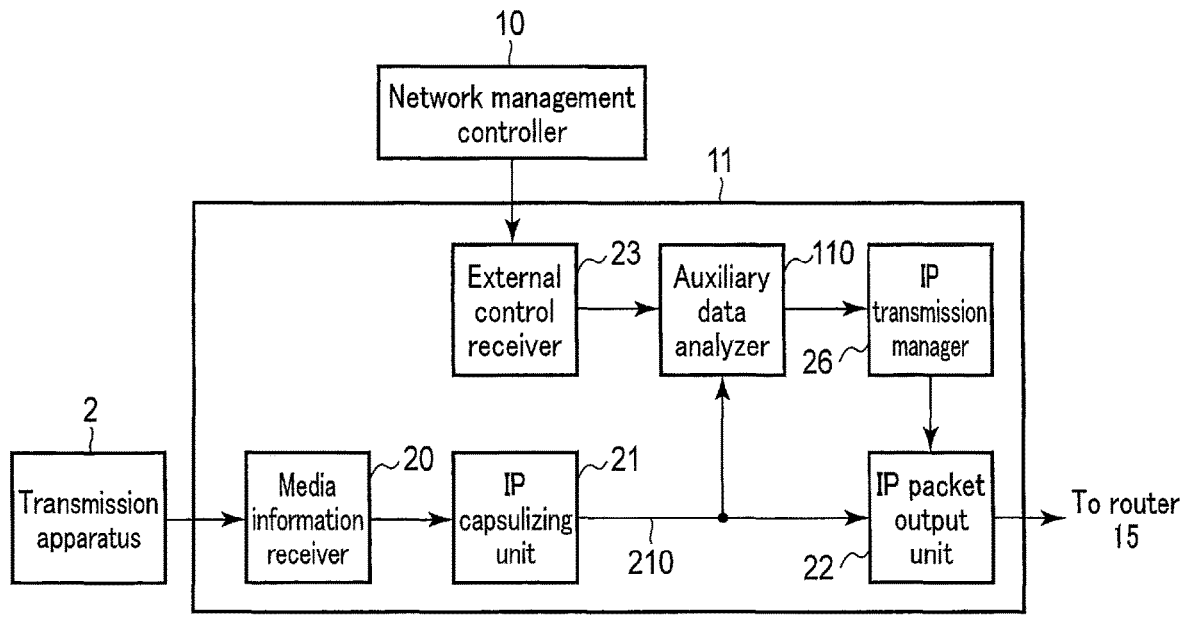
FIG. 23 is a block diagram illustrating a configuration example of an IP gateway on the transmission side according to a fourth embodiment.

FIG. 23 is a block diagram illustrating a configuration example of an IP gateway on the transmission side according to a fourth embodiment.

As illustrated in FIG. 23, the IP-GW 11 in this embodiment is configured to include an IP transmission manager 26 in place of the multicast manager 25 in the IP-GW 11 illustrated in FIG. 13A.

Figure 24:
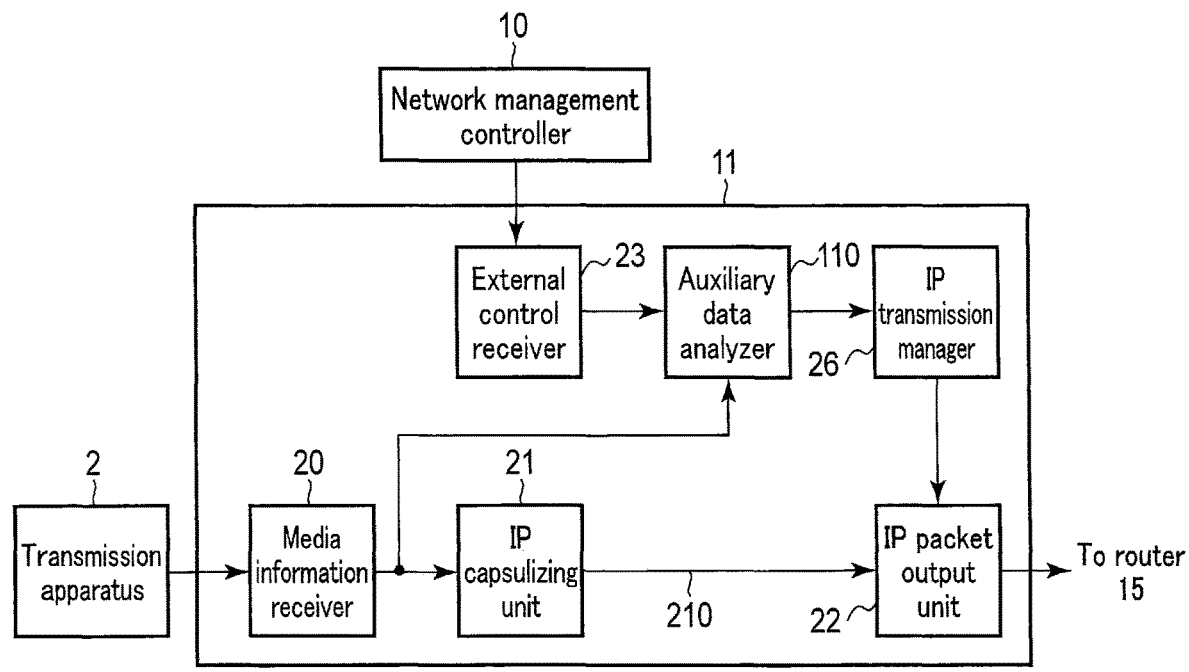
FIG. 24 is a block diagram illustrating another configuration example of the IP gateway on the transmission side according to the fourth embodiment.

FIG. 24 is a block diagram illustrating another configuration example of the IP gateway on the transmission side according to the fourth embodiment.

As illustrated in FIG. 24, the IP-GW 11, which is another configuration example in the present embodiment, is configured to include an IP transmission manager 26 in place of the multicast manager 25 in the IP-GW 11 illustrated in FIG. 14A.

In each of the IP-GW 11 illustrated in FIG. 23 and the IP-GW 11 illustrated in FIG. 24, the IP transmission manager 26 controls the IP packet output unit 22, based on the start point or end point of media information detected by the auxiliary data analyzer 110, so as to start or end the transmission of a predetermined IP packet.

In accordance with the control of the IP transmission manager 26, the IP packet output unit 22 starts or ends the sending of the predetermined IP packet to the IP network 1 (router 15).

(Modification 1)

FIG. 25 is a view illustrating a configuration example of an IP transmission apparatus according to Modification 1 of the fourth embodiment.

As illustrated in FIG. 25, the IP transmission apparatus 12 in the present modification is configured to include an IP transmission manager 26 in place of the multicast manager 25 in the IP transmission apparatus illustrated in FIG. 15A.

The IP transmission manager 26 controls the IP packet output unit 22, based on the start point or end point of media information detected by the auxiliary data analyzer 160, so as to control the start or end of the transmission of a predetermined IP packet.

(Modification 2)

FIG. 26 is a view illustrating a configuration example of an IP gateway according to Modification 2 of the fourth embodiment.

As illustrated in FIG. 26, the IP-GW 11 in the present modification is configured to include an IP transmission manager 26 in place of the multicast manager 25 in the IP-GW 11 illustrated in FIG. 16A.

The IP transmission manager 26 controls the IP packet output unit 22, based on the start point or end point of media information detected by the auxiliary data analyzer 160, so as to control the start or end of the transmission of a predetermined IP packet.

In this manner, in the systems to which the present embodiment and Modifications 1 and 2 are applied, like the system of the above-described third embodiment, even when a delay or jitter exists in the transmission on the IP network, media information can be seamlessly transmitted in the content delivery, while avoiding missing of valid data or mixing of invalid data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A content delivery apparatus applied to a content delivery system which delivers content, which is sent from a transmission apparatus, to a reception apparatus by a multicast method via an IP network, the content delivery apparatus comprising:
   an analyzer configured to detect a start point or an end point of the content by analyzing auxiliary data included in the content, the auxiliary data including control information of the content; and
   a manager configured to control a reception start or a reception end of the content, based on the start point or the end point,
   wherein the control information includes a marker bit that indicates boundary information of video data of the content, and further includes at least one of a time stamp that indicates timing information of the content or a frame count that indicates a count value of a frame in the content, and
   the analyzer is further configured to detect the start point or the end point of the content based on a combination of the marker bit and the time stamp or based on a combination of the marker bit and the frame count.

2. The content delivery apparatus of claim 1, further comprising:
   an input unit configured to start reception of the content in accordance with the reception start, and to end the reception of the content in accordance with the reception end; and
   a transmitter configured to send the content received by the input unit to the reception apparatus.

3. The content delivery apparatus of claim 1, wherein the analyzer is further configured to
   monitor the auxiliary data included in the content that is sent from the transmission apparatus.

4. A content delivery system that delivers content, which is sent from a transmission apparatus to a reception apparatus by a multicast method via an IP network, the content delivery system comprising:
   an analyzer configured to detect a start point or an end point of the content by analyzing auxiliary data included in the content, the auxiliary data including control information of the content;
   a manager configured to control a reception start or a reception end of the content, based on the start point or the end point;
   an input unit configured to start reception of content in accordance with the reception start, and to end the reception of the content in accordance with the reception end; and
   a transmitter configured to send the received content to the reception apparatus,
   wherein the control information includes a marker bit that indicates boundary information of video data of the content, and further includes at least one of a time stamp that indicates timing information of the content or a frame count that indicates a count value of a frame in the content, and
   the analyzer is further configured to detect the start point or the end point of the content based on a combination of the marker bit and the time stamp or based on a combination of the marker bit and the frame count.

5. The content delivery system of claim 4, wherein the analyzer is further configured to
   monitor the auxiliary data included in the content which is sent from the transmission apparatus.

6. A method applied to a content delivery system that delivers content, which is sent from a transmission apparatus to a reception apparatus by a multicast method via an IP network, the method comprising:
   detecting a start point or an end point of the content by analyzing auxiliary data included in the content, the auxiliary data including control information of the content;
   controlling a reception start or a reception end of the content, based on the start point or the end point;
   starting reception of the content in accordance with the reception start, and ending the reception of the content in accordance with the reception end; and
   sending the received content to the reception apparatus,
   wherein the control information includes a marker bit that indicates boundary information of video data of the content, and further includes at least one of a time stamp that indicates timing information of the content or a frame count that indicates a count value of a frame in the content, and
   the detecting step further includes detecting the start point or the end point of the content based on a combination of the marker bit and the time stamp or based on a combination of the marker bit and the frame count.

7. The method of claim 6, wherein the step of detecting further comprises
   monitoring the auxiliary data included in the content that is sent from the transmission apparatus.

* * * * *